US012777249B2

(12) United States Patent
Golchha et al.

(10) Patent No.: US 12,777,249 B2
(45) Date of Patent: *Oct. 27, 2026

(54) APPARATUS AND METHODS FOR SLIDE IMAGING

(71) Applicant: Pramana, Inc., Cambridge, MA (US)

(72) Inventors: Priyanka Golchha, Rajasthan (IN); Raghubansh Bahadur Gupta, Bangalore (IN); Shilpa G Krishna, Kerala (IN); Parveen Shaik Gangirevula, Bengaluru (IN); Durgaprasad Dodle, Telangana (IN); Pavani Pallavi Pelluru, Pocharam (IN); Prasanth Perugupalli, Cary, NC (US)

(73) Assignee: Pramana, Inc., Cambridge, MA (US)

( * ) Notice: Subject to any disclaimer, the term of this patent is extended or adjusted under 35 U.S.C. 154(b) by 107 days.

This patent is subject to a terminal disclaimer.

(21) Appl. No.: 18/930,156

(22) Filed: Oct. 29, 2024

(65) Prior Publication Data

US 2025/0142213 A1 May 1, 2025

Related U.S. Application Data

(63) Continuation of application No. 18/384,840, filed on Oct. 28, 2023, now Pat. No. 12,160,665.

(51) Int. Cl.
*H04N 23/67* (2023.01)
*G02B 21/00* (2006.01)
(Continued)

(52) U.S. Cl.
CPC ......... *H04N 23/675* (2023.01); *G02B 21/006* (2013.01); *G02B 21/34* (2013.01); *H04N 23/62* (2023.01)

(58) Field of Classification Search
CPC .... H04N 23/675; H04N 23/62; G02B 21/006; G02B 21/34; G02B 21/367; G02B 21/244
See application file for complete search history.

(56) References Cited

U.S. PATENT DOCUMENTS 7,772,535 B2 8/2010 Krief et al.
10,255,693 B2 4/2019 Smith
(Continued)

FOREIGN PATENT DOCUMENTS

EP 2381287 A1 10/2011
JP 2009014939 A 1/2009
WO 2016056205 A1 4/2016

OTHER PUBLICATIONS

Zichao Bian et al: "Autofocusing technologies for whole slide imaging and automated microscopy", arxiv.org, Cornell University Library, 201 Olin Library Cornell University Ithaca, NY 14853, Jun. 15, 2020 (Jun. 15, 2020), XP081741817.
(Continued)

*Primary Examiner* — Padma Haliyur
(74) *Attorney, Agent, or Firm* — CALDWELL LLC

(57) ABSTRACT

An apparatus for imaging a slide, the apparatus including at least an optical system, including an optical sensor, a slide port configured to hold the slide, at least a processor, and a memory communicatively connected to the at least a processor, the memory containing instructions configuring the at least a processor to receive at least a region of interest, capture, using the at least an optical system, a plurality of first images of the slide at a first position within the at least a region of interest, wherein each of the plurality of first images has a different focus distance, and identify a focus pattern.

20 Claims, 8 Drawing Sheets

(51) Int. Cl.
*G02B 21/34* (2006.01)
*H04N 23/62* (2023.01)

(56) References Cited

U.S. PATENT DOCUMENTS

| | | | |
|---|---|---|---|
| 2009/0195688 | A1 | 8/2009 | Henderson et al. |
| 2010/0240021 | A1 | 9/2010 | Berndt |
| 2011/0164314 | A1 | 7/2011 | Shirota et al. |
| 2016/0298952 | A1 | 10/2016 | Yablon et al. |
| 2020/0167960 | A1 | 5/2020 | Walls et al. |
| 2020/0379232 | A1 | 12/2020 | Feirer et al. |
| 2021/0149170 | A1 | 5/2021 | Leshem et al. |
| 2022/0028116 | A1 | 1/2022 | Sieckmann et al. |
| 2023/0115733 | A1 | 4/2023 | Oldfather |
| 2023/0206416 | A1 | 6/2023 | Maier |
| 2023/0385578 | A1 | 11/2023 | Gurevich et al. |

OTHER PUBLICATIONS

Li Bin et al: "Hardware-software co-design of an open-source automatic multimodal whole slide histopathology imaging system", Journal of Biomedical Optics, SPIE, 1000 20th St. Bellingham WA 98225-6705 USA, vol. 28, No. 2, Feb. 1, 2023 (Feb. 1, 2023), p. 26501, XP060172120, ISSN: 1083-3668, DOI: 10.1117/1.JBO.28.2.026501 [retrieved on Feb. 8, 2023].

European Search Report; EP24206268; Date: Apr. 7, 2025.

APPARATUS AND METHODS FOR SLIDE IMAGING

CROSS-REFERENCE TO RELATED APPLICATIONS

This application is a continuation of Non-provisional application Ser. No. 18/384,840 filed on Oct. 28, 2023, and entitled "APPARATUS AND METHODS FOR SLIDE IMAGING," the entirety of which is incorporated herein by reference.

FIELD OF THE INVENTION

The present invention generally relates to the field of medical imaging. In particular, the present invention is directed to apparatus and methods for slide imaging.

BACKGROUND

The cost of out-of-focus errors in the scanning of a slide can be high, particularly in the time that is lost to make a decision based on that slide. Approaches to digitize slides within a single pass have to necessarily make decisions on the best focus z plane during that single scan, thus forcing them to make decisions in a situation where tissue, debris, pen-marks, and the like may be present on the slide. For example, encountering debris could force the scanning to choose a wrong z—reference plane which then makes the tissue that follows that debris out-of-focus. Similarly, a pen mark could force the tissue completely out-of-focus because of the z-plane of the pen-mark on top of a coverslip.

SUMMARY OF THE DISCLOSURE

In an aspect, an embodiment of an apparatus for imaging a slide is described. The apparatus includes at least an optical system, including an optical sensor, at least a processor, and a memory communicatively connected to the at least a processor, the memory containing instructions configuring the at least a processor to capture, using the at least an optical system, a plurality of first images of the slide at a first position, wherein each of the plurality of first images includes a different focus distance, identify a focus pattern, wherein identifying the focus pattern includes using respective focus distances of a plurality of optimally focused images at a set of points along a row, extrapolate a focus distance for a second position as a function of the focus pattern, and capture, using the at least an optical system, a second image of the slide at a second position and at the focus distance.

In another aspect, an embodiment of a method of imaging a slide is described. The method includes capturing, by at least a computing device and an optical system, a plurality of first images of the slide at a first position, wherein each of the plurality of first images comprises a different focus distance, wherein the optical system comprises an optical sensor, identifying, by the at least a computing device, a focus pattern, wherein identifying the focus pattern comprises using respective focus distances of a plurality of optimally focused images at a set of points along a row, extrapolating, by the at least a computing device, a focus distance for a second position as a function of the focus pattern, and capturing, by the at least a computing device and the optical system, a second image of the slide at the second position and at the focus distance.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to apparatus and methods for slide imaging. Apparatus described herein may generate images of slides and/or samples on slides. In an embodiment, said apparatus may capture a first image and identify one or more regions of interest. Regions of interest may include features such as writing, debris, and a sample. A sample may include tissue. In an embodiment, an apparatus may identify a focus pattern of a region of interest. For example, apparatus may identify a focus pattern as a plane based on a plurality of points at which an optimal focus is determined. In an embodiment, apparatus may determine which regions of interest contain a sample. In some embodiments, which regions contain a sample may be determined after one or more other steps described herein. In some embodiments, delaying a determination as to which regions contain a sample may make a slide imaging process more efficient. For example, efficiency gains may result from the difficulty of running sophisticated models on a scanning device during a scan. In another example, efficiency gains may result from minimizing the risk of false positives when classifying a region as debris or annotation and skipping over a scan of a region. In another example, performing steps in this order may be optimal because scanning annotations may be useful. Exemplary embodiments illustrating aspects of the present disclosure are described below in the context of several specific examples.

Figure 1:
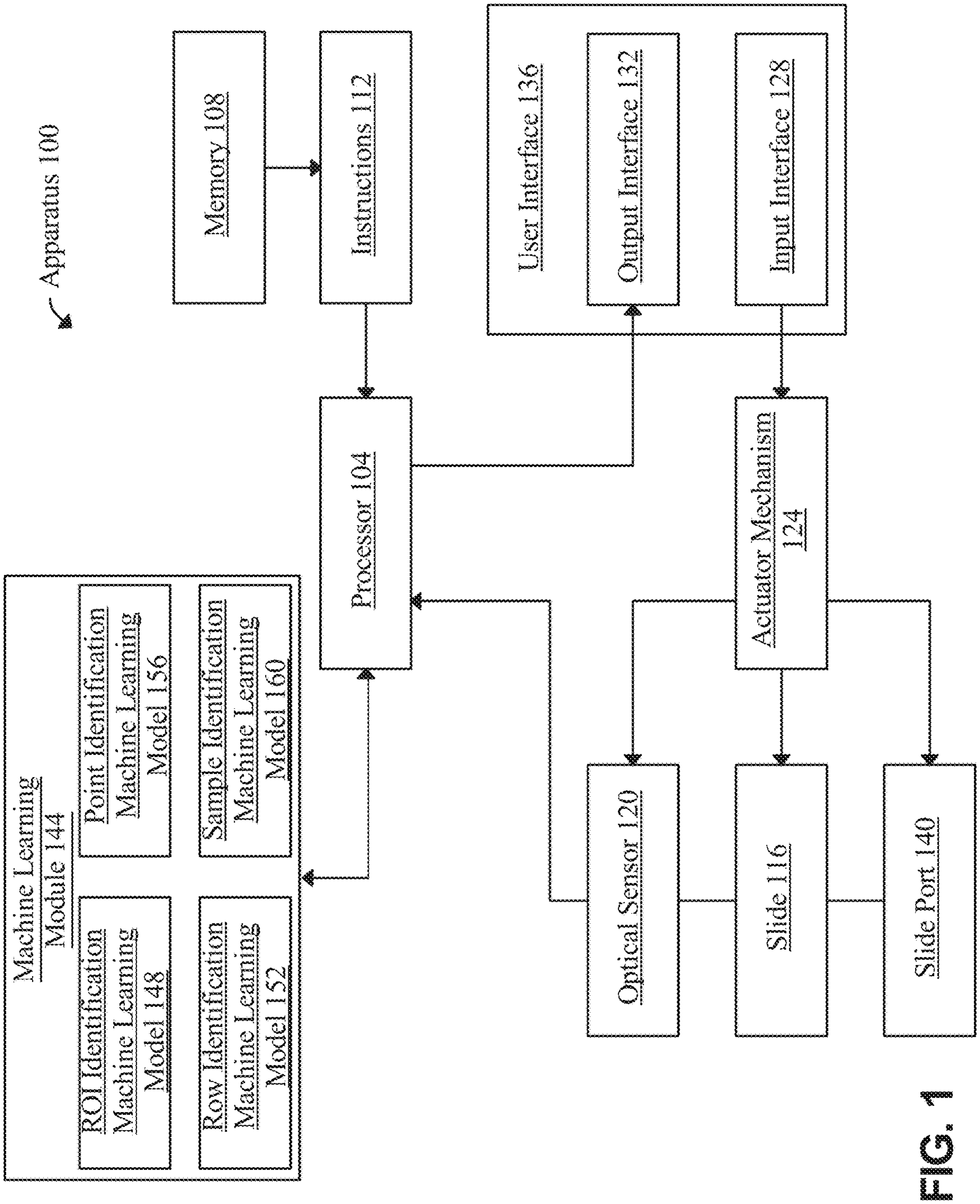
FIG. 1 is a diagram depicting an exemplary apparatus for slide imaging.

Referring now to FIG. 1, an exemplary embodiment of an apparatus 100 for slide imaging. Apparatus 100 may include a computing device. Apparatus 100 may include a processor 104. Processor 104 may include, without limitation, any processor 104 described in this disclosure. Processor 104 may be included in a computing device. Apparatus 100 may include at least a processor 104 and a memory 108 communicatively connected to the at least a processor 104, the memory 108 containing instructions 112 configuring the at least a processor 104 to perform one or more processes described herein. Computing device may include any computing device as described in this disclosure, including without limitation a microcontroller, microprocessor, digital signal processor (DSP) and/or system on a chip (SoC) as described in this disclosure. Computing device may include, be included in, and/or communicate with a mobile device such as a mobile telephone or smartphone. Computing device may include a single computing device operating independently, or may include two or more computing device operating in concert, in parallel, sequentially or the like; two or more computing devices may be included together in a single computing device or in two or more computing devices. Computing device may interface or communicate with one or more additional devices as described below in further detail via a network interface device. Network interface device may be utilized for connecting computing device to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Computing device may include but is not limited to, for example, a computing device or cluster of computing devices in a first location and a second computing device or cluster of computing devices in a second location. Computing device may include one or more computing devices dedicated to data storage, security, distribution of traffic for load balancing, and the like. Computing device may distribute one or more computing tasks as described below across a plurality of computing devices of computing device, which may operate in parallel, in series, redundantly, or in any other manner used for distribution of tasks or memory between computing devices. Computing device may be implemented, as a non-limiting example, using a "shared nothing" architecture.

With continued reference to FIG. 1, computing device may be designed and/or configured to perform any method, method step, or sequence of method steps in any embodiment described in this disclosure, in any order and with any degree of repetition. For instance, computing device may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Computing device may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Still referring to FIG. 1, as used in this disclosure, "communicatively connected" means connected by way of a connection, attachment or linkage between two or more relata which allows for reception and/or transmittance of information therebetween. For example, and without limitation, this connection may be wired or wireless, direct or indirect, and between two or more components, circuits, devices, systems, and the like, which allows for reception and/or transmittance of data and/or signal(s) therebetween. Data and/or signals therebetween may include, without limitation, electrical, electromagnetic, magnetic, video, audio, radio and microwave data and/or signals, combinations thereof, and the like, among others. A communicative connection may be achieved, for example and without limitation, through wired or wireless electronic, digital or analog, communication, either directly or by way of one or more intervening devices or components. Further, communicative connection may include electrically coupling or connecting at least an output of one device, component, or circuit to at least an input of another device, component, or circuit. For example, and without limitation, via a bus or other facility for intercommunication between elements of a computing device. Communicative connecting may also include indirect connections via, for example and without limitation, wireless connection, radio communication, low power wide area network, optical communication, magnetic, capacitive, or optical coupling, and the like. In some instances, the terminology "communicatively coupled" may be used in place of communicatively connected in this disclosure.

Still referring to FIG. 1, in some embodiments, apparatus 100 may be used to generate an image of slide 116 and/or a sample on slide 116. As used herein, a "slide" is a container or surface holding a sample of interest. In some embodiments, slide 116 may include a glass slide. In some embodiments, slide 116 may include a formalin fixed paraffin embedded slide. In some embodiments, a sample on slide 116 may be stained. In some embodiments, slide 116 may be substantially transparent. In some embodiments, slide 116 may include a thin, flat, and substantially transparent glass slide. In some embodiments, a transparent cover may be applied to slide 116 such that a sample is between slide 116 and this cover. A sample may include, in non-limiting examples, a blood smear, pap smear, body fluids, and non-biologic samples. In some embodiments, a sample on slide 116 may include tissue. In some embodiments, sample on slide 116 may be frozen.

Still referring to FIG. 1, in some embodiments, slide 116 and/or a sample on slide 116 may be illuminated. In some embodiments, apparatus 100 may include a light source. As used herein, a "light source" is any device configured to emit electromagnetic radiation. In some embodiments, light source may emit a light having substantially one wavelength. In some embodiments, light source may emit a light having a wavelength range. Light source may emit, without limitation, ultraviolet light, visible light, and/or infrared light. In non-limiting examples, light source may include a light-emitting diode (LED), an organic LED (OLED) and/or any other light emitter. Such a light source may be configured to illuminate slide 116 and/or sample on slide 116. In a non-limiting example, light source may illuminate slide 116 and/or sample on slide 116 from below.

Still referring to FIG. 1, in some embodiments, apparatus 100 may include at least an optical system. As used in this disclosure, an "optical system" is an arrangement of one or more components which together act upon or employ electromagnetic radiation. In non-limiting examples, electromagnetic radiation may include light, such as visible light, infrared light, UV light, and the like. An optical system may include one or more optical elements, including without limitation lenses, mirrors, windows, filters, and the like. An optical system may form an optical image that corresponds to an optical object. For instance, an optical system may form an optical image at or upon an optical sensor, which can capture, e.g., digitize, the optical image. In some cases, optical system may have at least a magnification. For instance, optical system may include an objective (e.g., microscope objective) and one or more reimaging optical elements that together produce an optical magnification. In some cases, optical magnification may be referred to herein as zoom. As used herein, an "optical sensor" is a device that measures light and converts the measured light into one or more signals; one or more signals may include, without limitation, one or more electrical signals. In some embodiments, optical sensor 120 may include at least a photodetector. As used herein, a "photodetector" is a device that is sensitive to light and thereby able to detect light. In some embodiments, a photodetector may include a photodiode, a photoresistor, a photosensor, a photovoltaic chip, and the like. In some embodiments, optical sensor 120 may include a plurality of photodetectors. Optical sensor 120 may include, without limitation, a camera. Optical sensor 120 may be in electronic communication with at least a processor 104 of apparatus 100. As used herein, "electronic communication" as used in this disclosure is a shared data connection between two or more devices. In some embodiments, apparatus 100 may include two or more optical sensors 120.

Still referring to FIG. 1, as used herein, "image data" is information representing at least a physical scene, space, and/or object. Image data may include, for example, information representing a sample, slide 116, or region of a sample or slide. In some cases, image data may be generated by a camera. "Image data" may be used interchangeably through this disclosure with "image," where image is used as a noun. An image may be optical, such as without limitation where at least an optic is used to generate an image of an object. An image may be digital, such as without limitation when represented as a bitmap. Alternatively, an image may include any media capable of representing a physical scene, space, and/or object. Alternatively, where "image" is used as a verb, in this disclosure, it refers to generation and/or formation of an image.

Still referring to FIG. 1, in some embodiments, apparatus 100 may include a slide port 140. In some embodiments, slide port 140 may be configured to hold slide 116. In some embodiments, slide port 140 may include one or more alignment features. As used herein, an "alignment feature" is a physical feature that helps to secure a slide in place and/or align a slide with another component of an apparatus. In some embodiments, alignment feature may include a component which keeps slide 116 secure, such as a clamp, latch, clip, recessed area, or another fastener. In some embodiments, slide port 140 may allow for easy removal or insertion of slide 116. In some embodiments, slide port 140 may include a transparent surface through which light may travel. In some embodiments, slide 116 may rest on and/or may be illuminated by light traveling through such a transparent surface. In some embodiments, slide port 140 may be mechanically connected to an actuator mechanism 124 as described below.

Still referring to FIG. 1, in some embodiments, apparatus 100 may include an actuator mechanism 124. As used herein, an "actuator mechanism" is a mechanical component configured to change the relative position of a slide and an optical system. In some embodiments, actuator mechanism 124 may be mechanically connected to slide 116, such as slide 116 in slide port 140. In some embodiments, actuator mechanism 124 may be mechanically connected to slide port 140. For example, actuator mechanism 124 may move slide port 140 in order to move slide 116. In some embodiments, actuator mechanism 124 may be mechanically connected to at least an optical system. In some embodiments, actuator mechanism 124 may be mechanically connected to a mobile element. As used herein, a "mobile element" refers to any movable or portable object, component, and device within apparatus 100 such as, without limitation, a slide, a slide port, or an optical system. In some embodiments, a mobile element may move such that optical system is positioned correctly with respect to slide 116 such that optical system may capture an image of slide 116 according to a parameter set. In some embodiments, actuator mechanism 124 may be mechanically connected to an item selected from the list consisting of slide port 140, slide 116, and at least an optical system. In some embodiments, actuator mechanism 124 may be configured to change the relative position of slide 116 and optical system by moving slide port 140, slide 116, and/or optical system.

Still referring to FIG. 1, actuator mechanism 124 may include a component of a machine that is responsible for moving and/or controlling a mechanism or system. Actuator mechanism 124 may, in some embodiments, require a control signal and/or a source of energy or power. In some cases, a control signal may be relatively low energy. Exemplary control signal forms include electric potential or current, pneumatic pressure or flow, or hydraulic fluid pressure or flow, mechanical force/torque or velocity, or even human power. In some cases, an actuator may have an energy or power source other than control signal. This may include a main energy source, which may include for example electric power, hydraulic power, pneumatic power, mechanical power, and the like. In some embodiments, upon receiving a control signal, actuator mechanism 124 responds by converting source power into mechanical motion. In some cases, actuator mechanism 124 may be understood as a form of automation or automatic control.

Still referring to FIG. 1, in some embodiments, actuator mechanism 124 may include a hydraulic actuator. A hydraulic actuator may consist of a cylinder or fluid motor that uses hydraulic power to facilitate mechanical operation. Output of hydraulic actuator mechanism 124 may include mechanical motion, such as without limitation linear, rotatory, or oscillatory motion. In some embodiments, hydraulic actuator may employ a liquid hydraulic fluid. As liquids, in some cases, are incompressible, a hydraulic actuator can exert large forces. Additionally, as force is equal to pressure multiplied by area, hydraulic actuators may act as force transformers with changes in area (e.g., cross sectional area of cylinder and/or piston). An exemplary hydraulic cylinder may consist of a hollow cylindrical tube within which a piston can slide. In some cases, a hydraulic cylinder may be considered single acting. Single acting may be used when fluid pressure is applied substantially to just one side of a piston. Consequently, a single acting piston can move in only one direction. In some cases, a spring may be used to give a single acting piston a return stroke. In some cases, a hydraulic cylinder may be double acting. Double acting may be used when pressure is applied substantially on each side of a piston; any difference in resultant force between the two sides of the piston causes the piston to move.

Still referring to FIG. 1, in some embodiments, actuator mechanism 124 may include a pneumatic actuator mechanism 124. In some cases, a pneumatic actuator may enable considerable forces to be produced from relatively small changes in gas pressure. In some cases, a pneumatic actuator may respond more quickly than other types of actuators, for example hydraulic actuators. A pneumatic actuator may use compressible fluid (e.g., air). In some cases, a pneumatic actuator may operate on compressed air. Operation of hydraulic and/or pneumatic actuators may include control of one or more valves, circuits, fluid pumps, and/or fluid manifolds.

Still referring to FIG. 1, in some cases, actuator mechanism 124 may include an electric actuator. Electric actuator mechanism 124 may include any of electromechanical actuators, linear motors, and the like. In some cases, actuator mechanism 124 may include an electromechanical actuator. An electromechanical actuator may convert a rotational force of an electric rotary motor into a linear movement to generate a linear movement through a mechanism. Exemplary mechanisms, include rotational to translational motion transformers, such as without limitation a belt, a screw, a crank, a cam, a linkage, a scotch yoke, and the like. In some cases, control of an electromechanical actuator may include control of electric motor, for instance a control signal may control one or more electric motor parameters to control electromechanical actuator. Exemplary non-limitation electric motor parameters include rotational position, input torque, velocity, current, and potential. Electric actuator mechanism 124 may include a linear motor. Linear motors may differ from electromechanical actuators, as power from linear motors is output directly as translational motion, rather than output as rotational motion and converted to translational motion. In some cases, a linear motor may cause lower friction losses than other devices. Linear motors may be further specified into at least 3 different categories, including flat linear motor, U-channel linear motors and tubular linear motors. Linear motors may be directly controlled by a control signal for controlling one or more linear motor parameters. Exemplary linear motor parameters include without limitation position, force, velocity, potential, and current.

Still referring to FIG. 1, in some embodiments, an actuator mechanism 124 may include a mechanical actuator mechanism 124. In some cases, a mechanical actuator mechanism 124 may function to execute movement by converting one kind of motion, such as rotary motion, into another kind, such as linear motion. An exemplary mechanical actuator includes a rack and pinion. In some cases, a mechanical power source, such as a power take off may serve as power source for a mechanical actuator. Mechanical actuators may employ any number of mechanisms, including for example without limitation gears, rails, pulleys, cables, linkages, and the like.

Still referring to FIG. 1, in some embodiments, actuator mechanism 124 may be in electronic communication with actuator controls. As used herein, "actuator controls" is a system configured to operate actuator mechanism such that a slide and an optical system reach a desired relative position. In some embodiments, actuator controls may operate actuator mechanism 124 based on input received from a user interface 136. In some embodiments, actuator controls may be configured to operate actuator mechanism 124 such that optical system is in a position to capture an image of an entire sample. In some embodiments, actuator controls may be configured to operate actuator mechanism 124 such that optical system is in a position to capture an image of a region of interest, a particular horizontal row, a particular point, a particular focus depth, and the like. Electronic communication between actuator mechanism 124 and actuator controls may include transmission of signals. For example, actuator controls may generate physical movements of actuator mechanism in response to an input signal. In some embodiments, input signal may be received by actuator controls from processor 104 or input interface 128.

Still referring to FIG. 1, as used in this disclosure, a "signal" is any intelligible representation of data, for example from one device to another. A signal may include an optical signal, a hydraulic signal, a pneumatic signal, a mechanical signal, an electric signal, a digital signal, an analog signal, and the like. In some cases, a signal may be used to communicate with a computing device, for example by way of one or more ports. In some cases, a signal may be transmitted and/or received by a computing device, for example by way of an input/output port. An analog signal may be digitized, for example by way of an analog to digital converter. In some cases, an analog signal may be processed, for example by way of any analog signal processing steps described in this disclosure, prior to digitization. In some cases, a digital signal may be used to communicate between two or more devices, including without limitation computing devices. In some cases, a digital signal may be communicated by way of one or more communication protocols, including without limitation internet protocol (IP), controller area network (CAN) protocols, serial communication protocols (e.g., universal asynchronous receiver-transmitter [UART]), parallel communication protocols (e.g., IEEE 1284 [printer port]), and the like.

Still referring to FIG. 1, in some embodiments, apparatus 100 may perform one or more signal processing steps on a signal. For instance, apparatus 100 may analyze, modify, and/or synthesize a signal representative of data in order to improve the signal, for instance by improving transmission, storage efficiency, or signal to noise ratio. Exemplary methods of signal processing may include analog, continuous time, discrete, digital, nonlinear, and statistical. Analog signal processing may be performed on non-digitized or analog signals. Exemplary analog processes may include passive filters, active filters, additive mixers, integrators, delay lines, compandors, multipliers, voltage-controlled filters, voltage-controlled oscillators, and phase-locked loops. Continuous-time signal processing may be used, in some cases, to process signals which vary continuously within a domain, for instance time. Exemplary non-limiting continuous time processes may include time domain processing, frequency domain processing (Fourier transform), and complex frequency domain processing. Discrete time signal processing may be used when a signal is sampled non-continuously or at discrete time intervals (i.e., quantized in time). Analog discrete-time signal processing may process a signal using the following exemplary circuits sample and hold circuits, analog time-division multiplexers, analog delay lines and analog feedback shift registers. Digital signal processing may be used to process digitized discrete-time sampled signals. Commonly, digital signal processing may be performed by a computing device or other specialized digital circuits, such as without limitation an application specific integrated circuit (ASIC), a field-programmable gate array (FPGA), or a specialized digital signal processor (DSP). Digital signal processing may be used to perform any combination of typical arithmetical operations, including fixed-point and floating-point, real-valued and complex-valued, multiplication and addition. Digital signal processing may additionally operate circular buffers and lookup tables. Further non-limiting examples of algorithms that may be performed according to digital signal processing techniques include fast Fourier transform (FFT), finite impulse response (FIR) filter, infinite impulse response (IIR) filter, and adaptive filters such as the Wiener and Kalman filters. Statistical signal processing may be used to process a signal as a random function (i.e., a stochastic process), utilizing statistical properties. For instance, in some embodiments, a signal may be modeled with a probability distribution indicating noise, which then may be used to reduce noise in a processed signal.

Still referring to FIG. 1, in some embodiments, apparatus 100 may include a user interface 136. User interface 136 may include output interface 132 and input interface 128.

Still referring to FIG. 1, in some embodiments, output interface 132 may include one or more elements through which apparatus 100 may communicate information to a user. In a non-limiting example, output interface 132 may include a display. A display may include a high resolution display. A display may output images, videos, and the like to a user. In another non-limiting example, output interface 132 may include a speaker. A speaker may output audio to a user. In another non-limiting example, output interface 132 may include a haptic device. A speaker may output haptic feedback to a user.

Still referring to FIG. 1, in some embodiments, optical system may include a camera. In some cases, a camera may include one or more optics. Exemplary non-limiting optics include spherical lenses, aspherical lenses, reflectors, polarizers, filters, windows, aperture stops, and the like. In some embodiments, one or more optics associated with a camera may be adjusted in order to, in non-limiting examples, change the zoom, depth of field, and/or focus distance of the camera. In some embodiments, one or more of such settings may be configured to detect a feature of a sample on slide 116. In some embodiments, one or more of such settings may be configured based on a parameter set, as described below. In some embodiments, camera may capture images at a low depth of field. In a non-limiting example, camera may capture images such that a first depth of sample is in focus and a second depth of sample is out of focus. In some embodiments, an autofocus mechanism may be used to determine focus distance. In some embodiments, focus distance may be set by parameter set. In some embodiments, camera may be configured to capture a plurality of images at different focus distances. In a non-limiting example, camera may capture a plurality of images at different focus distances, such that images are captured where each focus depth of the sample is in focus in at least one image. In some embodiments, at least a camera may include an image sensor. Exemplary non-limiting image sensors include digital image sensors, such as without limitation charge-coupled device (CCD) sensors and complimentary metal-oxide-semiconductor (CMOS) sensors. In some embodiments, a camera may be sensitive within a non-visible range of electromagnetic radiation, such as without limitation infrared.

Still referring to FIG. 1, in some embodiments, input interface 128 may include controls for operating apparatus 100. Such controls may be operated by a user. Input interface 128 may include, in non-limiting examples, a camera, microphone, keyboard, touch screen, mouse, joystick, foot pedal, button, dial, and the like. Input interface 128 may accept, in non-limiting examples, mechanical input, audio input, visual input, text input, and the like. In some embodiments, audio inputs into input interface 128 may be interpreted using an automatic speech recognition function, allowing a user to control apparatus 100 via speech. In some embodiments, input interface 128 may approximate controls of a microscope.

Still referring to FIG. 1, in some embodiments, audio inputs may be processed using automatic speech recognition. In some embodiments, automatic speech recognition may require training (i.e., enrollment). In some cases, training an automatic speech recognition model may require an individual speaker to read text or isolated vocabulary. In some cases, audio training data may include an audio component having an audible verbal content, the contents of which are known a priori by a computing device. Computing device may then train an automatic speech recognition model according to training data which includes audible verbal content correlated to known content. In this way, computing device may analyze a person's specific voice and train an automatic speech recognition model to the person's speech, resulting in increased accuracy. Alternatively, or additionally, in some cases, computing device may include an automatic speech recognition model that is speaker independent. As used in this disclosure, a "speaker independent" automatic speech recognition process does not require training for each individual speaker. Conversely, as used in this disclosure, automatic speech recognition processes that employ individual speaker specific training are "speaker dependent."

Still referring to FIG. 1, in some embodiments, an automatic speech recognition process may perform voice recognition or speaker identification. As used in this disclosure, "voice recognition" refers to identifying a speaker, from audio content, rather than what the speaker is saying. In some cases, computing device may first recognize a speaker of verbal audio content and then automatically recognize speech of the speaker, for example by way of a speaker dependent automatic speech recognition model or process. In some embodiments, an automatic speech recognition process can be used to authenticate or verify an identity of a speaker. In some cases, a speaker may or may not include subject. For example, subject may speak within audio inputs, but others may speak as well.

Still referring to FIG. 1, in some embodiments, an automatic speech recognition process may include one or all of acoustic modeling, language modeling, and statistically based speech recognition algorithms. In some cases, an automatic speech recognition process may employ hidden Markov models (HMMs). As discussed in greater detail below, language modeling such as that employed in natural language processing applications like document classification or statistical machine translation, may also be employed by an automatic speech recognition process.

Still referring to FIG. 1, an exemplary algorithm employed in automatic speech recognition may include or even be based upon hidden Markov models. Hidden Markov models (HMMs) may include statistical models that output a sequence of symbols or quantities. HMMs can be used in speech recognition because a speech signal can be viewed as a piecewise stationary signal or a short-time stationary signal. For example, over a short time scale (e.g., 10 milliseconds), speech can be approximated as a stationary process. Speech (i.e., audible verbal content) can be understood as a Markov model for many stochastic purposes.

Still referring to FIG. 1, in some embodiments HMMs can be trained automatically and may be relatively simple and computationally feasible to use. In an exemplary automatic speech recognition process, a hidden Markov model may output a sequence of n-dimensional real-valued vectors (with n being a small integer, such as 10), at a rate of about one vector every 10 milliseconds. Vectors may consist of cepstral coefficients. A cepstral coefficient requires using a spectral domain. Cepstral coefficients may be obtained by taking a Fourier transform of a short time window of speech yielding a spectrum, decorrelating the spectrum using a cosine transform, and taking first (i.e., most significant) coefficients. In some cases, an HMM may have in each state a statistical distribution that is a mixture of diagonal covariance Gaussians, yielding a likelihood for each observed vector. In some cases, each word, or phoneme, may have a different output distribution; an HMM for a sequence of words or phonemes may be made by concatenating an HMMs for separate words and phonemes.

Still referring to FIG. 1, in some embodiments, an automatic speech recognition process may use various combinations of a number of techniques in order to improve results. In some cases, a large-vocabulary automatic speech recognition process may include context dependency for phonemes. For example, in some cases, phonemes with different left and right context may have different realizations as HMM states. In some cases, an automatic speech recognition process may use cepstral normalization to normalize for different speakers and recording conditions. In some cases, an automatic speech recognition process may use vocal tract length normalization (VTLN) for male-female normalization and maximum likelihood linear regression (MLLR) for more general speaker adaptation. In some cases, an automatic speech recognition process may determine so-called delta and delta-delta coefficients to capture speech dynamics and might use heteroscedastic linear discriminant analysis (HLDA). In some cases, an automatic speech recognition process may use splicing and a linear discriminate analysis (LDA)-based projection, which may include heteroscedastic linear discriminant analysis or a global semi-tied covariance transform (also known as maximum likelihood linear transform [MLLT]). In some cases, an automatic speech recognition process may use discriminative training techniques, which may dispense with a purely statistical approach to HMM parameter estimation and instead optimize some classification-related measure of training data; examples may include maximum mutual information (MMI), minimum classification error (MCE), and minimum phone error (MPE).

Still referring to FIG. 1, in some embodiments, an automatic speech recognition process may be said to decode speech (i.e., audible verbal content). Decoding of speech may occur when an automatic speech recognition system is presented with a new utterance and must compute a most likely sentence. In some cases, speech decoding may include a Viterbi algorithm. A Viterbi algorithm may include a dynamic programming algorithm for obtaining a maximum a posteriori probability estimate of a most likely sequence of hidden states (i.e., Viterbi path) that results in a sequence of observed events. Viterbi algorithms may be employed in context of Markov information sources and hidden Markov models. A Viterbi algorithm may be used to find a best path, for example using a dynamically created combination hidden Markov model, having both acoustic and language model information, using a statically created combination hidden Markov model (e.g., finite state transducer [FST] approach).

Still referring to FIG. 1, in some embodiments, speech (i.e., audible verbal content) decoding may include considering a set of good candidates and not only a best candidate, when presented with a new utterance. In some cases, a better scoring function (i.e., re-scoring) may be used to rate each of a set of good candidates, allowing selection of a best candidate according to this refined score. In some cases, a set of candidates can be kept either as a list (i.e., N-best list approach) or as a subset of models (i.e., a lattice). In some cases, re-scoring may be performed by optimizing Bayes risk (or an approximation thereof). In some cases, re-scoring may include optimizing for sentence (including keywords) that minimizes an expectancy of a given loss function with regards to all possible transcriptions. For example, re-scoring may allow selection of a sentence that minimizes an average distance to other possible sentences weighted by their estimated probability. In some cases, an employed loss function may include Levenshtein distance, although different distance calculations may be performed, for instance for specific tasks. In some cases, a set of candidates may be pruned to maintain tractability.

Still referring to FIG. 1, in some embodiments, an automatic speech recognition process may employ dynamic time warping (DTW)-based approaches. Dynamic time warping may include algorithms for measuring similarity between two sequences, which may vary in time or speed. For instance, similarities in walking patterns would be detected, even if in one video the person was walking slowly and if in another he or she were walking more quickly, or even if there were accelerations and deceleration during the course of one observation. DTW has been applied to video, audio, and graphics—indeed, any data that can be turned into a linear representation can be analyzed with DTW. In some cases, DTW may be used by an automatic speech recognition process to cope with different speaking (i.e., audible verbal content) speeds. In some cases, DTW may allow computing device to find an optimal match between two given sequences (e.g., time series) with certain restrictions. That is, in some cases, sequences can be "warped" non-linearly to match each other. In some cases, a DTW-based sequence alignment method may be used in context of hidden Markov models.

Still referring to FIG. 1, in some embodiments, an automatic speech recognition process may include a neural network. Neural network may include any neural network, for example those disclosed with reference to FIGS. 2-4. In some cases, neural networks may be used for automatic speech recognition, including phoneme classification, phoneme classification through multi-objective evolutionary algorithms, isolated word recognition, audiovisual speech recognition, audiovisual speaker recognition and speaker adaptation. In some cases, neural networks employed in automatic speech recognition may make fewer explicit assumptions about feature statistical properties than HMMs and therefore may have several qualities making them attractive recognition models for speech recognition. When used to estimate the probabilities of a speech feature segment, neural networks may allow discriminative training in a natural and efficient manner. In some cases, neural networks may be used to effectively classify audible verbal content over short-time interval, for instance such as individual phonemes and isolated words. In some embodiments, a neural network may be employed by automatic speech recognition processes for pre-processing, feature transformation and/or dimensionality reduction, for example prior to HMM-based recognition. In some embodiments, long short-term memory (LSTM) and related recurrent neural networks (RNNs) and Time Delay Neural Networks (TDNN's) may be used for automatic speech recognition, for example over longer time intervals for continuous speech recognition.

Still referring to FIG. 1, in some embodiments, apparatus 100 captures a first image of slide 116 at a first position. In some embodiments, first image may be captured using at least an optical system.

Still referring to FIG. 1, in some embodiments, capturing a first image of a slide 116 at a first position may include using actuator mechanism 124 and/or actuator controls to move optical system and/or slide 116 into desired positions. In some embodiments, first image includes an image of the entire sample and/or the entire slide 116. In some embodiments, first image includes an image of a region of a sample. In some embodiments, first image includes a wider angle image than second image (described below). In some embodiments, first image may include a lower resolution image than second image.

Still referring to FIG. 1, in some embodiments, apparatus 100 may identify at least a region of interest within first image. In some embodiments, machine vision may be used to identify at least a region of interest. As used herein, a "region of interest" is a specific area within a slide, or a digital image of a slide, in which a feature is detected. A feature may include, in non-limiting examples, a sample, debris, writing on a slide, a crack in a slide, a bubble, and the like.

Still referring to FIG. 1, in some embodiments, apparatus 100 may include machine learning module 144. Machine learning is described with reference to FIG. 2. In some embodiments, apparatus 100 may use ROI identification machine learning model 148 to identify at least a region of interest. In some embodiments, ROI identification machine learning model 148 may be trained using supervised learning. In some embodiments, ROI identification machine learning model 148 may include a classifier. ROI identification machine learning model 148 may be trained on a dataset including example images of slides, associated with example regions of those images in which a feature is present. Such a training dataset may be gathered by, for example, gathering data slide imaging devices as to which regions of images of slides professionals focus or zoom in on. Once trained, ROI identification machine learning model 148 may accept as an input an image of a slide and may output data as to the location of any regions of interest present. In some embodiments, a neural network, such as a convolutional neural network, may be used to identify at least a region of interest. For example, a convolutional neural network may be used to detect edges in an image of a slide, and at least a region of interest may be identified based on the presence of edges. In some embodiments, at least a region of interest may be identified as a function of differences in brightness and/or color in comparison to a background brightness and/or color. In some embodiments, apparatus 100 may identify a region of interest using a classifier. In some embodiments, segments of an image may be input into a classifier, and the classifier may categorize them based on whether a region of interest is present. In some embodiments, a classifier may output a score indicating the degree to which a region of interest is detected and/or a confidence level that a region of interest is present. In some embodiments, a feature may be detected using a neural network or other machine learning model trained to detect a feature and/or object. For example, edges, corners, blobs, or ridges may be detected, and whether a location is determined to be within a region of interest may depend on detection of such elements. In some embodiments, a machine learning model such as a support vector machine technique may be used to determine a feature based on detection of elements such as edges, corners, blobs, or ridges.

Still referring to FIG. 1, in some embodiments, apparatus 100 may identify at least a region of interest as a function of user input. For example, a user may modify a setting on a degree of sensitivity with which to detect regions of interest. In this example, if a user input indicates a low degree of sensitivity, then apparatus 100 may only detect major regions of interest. This may involve, for example, ignoring potential regions of interest that are below a certain size. In another example, this may involve applying a machine learning model such as a classifier to an image (or segment of an image) and identifying it as a region of interest only if the machine learning model outputs a score higher than a threshold, where the score indicates the degree to which a region of interest is detected and/or a confidence level that a region of interest is present. In some embodiments, an image may be split into smaller segments and segments may be analyzed in order to determine whether at least a region of interest is present.

Still referring to FIG. 1, in some embodiments, apparatus 100 may receive at least a region of interest. In some embodiments, apparatus 100 may receive at least a region of interest without first capturing a first image. In a non-limiting example, a user may input a region of interest. In some embodiments, apparatus 100 may capture a first image, and may apply a received region of interest to the first image. This may be done, for example, where a region of interest is received before first image is captured. In some embodiments, apparatus 100 may capture a first image as a function of a region of interest. In a non-limiting example, apparatus 100 may receive a region of interest from a user through user input, and may capture a first image at a first position within the region of interest.

Still referring to FIG. 1, apparatus 100 may identify a focus pattern. In some embodiments, apparatus 100 may identify a focus pattern in at least a region of interest, such as in each region of interest detected as described herein. In some embodiments, identifying a focus pattern may include identifying a row, identifying a point within a row, determining an optimal focus at a point, and/or identifying a plane.

Still referring to FIG. 1, as used herein, a "row" of a digital image of a slide is a segment of a digital image of a slide between two parallel lines. A row may include, for example, a line of pixels with a width of 1 pixel. In another example, a row may have a width of multiple pixels. A row may or may not travel diagonally across a grid of pixels. As used herein, a "point" on a digital image of a slide is a specific position within a digital image of a slide. For example, in a digital image made up of a grid of pixels, a point may have a specific (x,y) position. As used herein, an "optimal focus" is a focus distance at which the subject that is being focused on is in focus.

Still referring to FIG. 1, in some embodiments, apparatus 100 may identify a row within a region of interest. A row may be identified based on a first row sample presence score.

A first row sample presence score may be identified using machine vision. A first row sample presence score may be identified based on an output of row identification machine learning model 152. A first row sample presence score may be identified by determining one or more row sample presence scores for adjacent rows. For example, a first row sample presence score may be determined as a function of a second row sample presence score and a third row sample presence score, where the second and third row sample presence scores are based on rows adjacent to the row of the first row sample presence score. As used herein, a "sample presence score" is a value representing or estimating the likelihood that sample is present in a location. As used herein, a "row sample presence score" is a sample presence score where the location is a row. A sample presence score need not represent sample presence likelihood as a percentage on a 0-100% scale. For example, a first row may have a row sample presence score of 2000 and a second row may have a row sample presence score of 3000, indicating that the second row is more likely to contain sample than the first row. A first row sample presence score may be identified, in non-limiting examples, based on a sum of row sample presence scores for adjacent rows and/or a weighted sum of row sample presence scores for adjacent rows and/or a minimum row sample presence score for adjacent rows. In some embodiments, a first set of row sample presence scores is identified using a machine learning model, such as row identification machine learning model 152, and a second set of row sample presence scores is identified based on row sample presence scores for adjacent rows from the first set of sample presence scores. In some embodiments, such a second set of row sample presence scores may be used to identify a best row. A row sample presence score may be identified by determining a sample presence score for rows not immediately adjacent to a row in question. For example, row sample presence scores may be determined for a row in question, adjacent rows, and rows separated from the row in question by a single row, and each of these row sample presence scores may factor into identifying a row (for example, using a weighted sum of sample presence scores). A sample presence score may be determined using machine vision. In some embodiments, a row sample presence score may be determined based on a section of a row that does not fully cross an image and/or slide. For example, a row sample presence score may be determined for the width of a region of interest. In another example, a row sample presence score may be determined for a section of a row with a certain pixel width.

Still referring to FIG. 1, in some embodiments, identifying a focus pattern may include identifying a row which includes a specific (X,Y) position, such as a position with which an optimal focus distance is to be calculated. In some embodiments, identifying a focus pattern may include capturing a plurality of images at such a location, wherein each of the plurality of images has a different focus distance. Such images may represent a z-stack as described further below. Identifying a focus pattern may further include determining an optimally focused image of the plurality of images. A focus distance of such image may be determined to be an optimal focus distance for that (X,Y) position. Optimal focus distances may be determined in this way for a plurality of points in that row. A focus pattern may be identified using focus distances of a plurality of optimally focused images at such plurality of points in the row.

Still referring to FIG. 1, in some embodiments, a row may further include a second position. Apparatus 100 may capture a plurality of second images at such second location, wherein each of the plurality of second images have a different focus distance. Apparatus 100 may determine an optimally focused second image of the plurality of second images having an optimal focus. Apparatus 100 may identify a focus pattern using the focus distance of an optimally focused first image and the optimally focused second image. For example, a focus pattern may be determined to include a line connecting the two points. Apparatus 100 may extrapolate a third focus distance for a third position as a function of a focus pattern. In some embodiments, extrapolating third focus distance may include using first or second focus distance as third focus distance. In some embodiments, extrapolation may include linear extrapolation, polynomial extrapolation, conic extrapolation, geometric extrapolation, and the like. In some embodiments, such third position may be located outside of a row including a first position and/or a second position. In some embodiments, such third position may be located within a different region of interest than a first position and/or a second position.

Still referring to FIG. 1, in some embodiments, a sample presence score may be determined using row identification machine learning model 152. In some embodiments, row identification machine learning model 152 may be trained using supervised learning. Row identification machine learning model may be trained on a dataset including example rows from images of slides, associated with whether a sample is present. Such a dataset may be gathered by, for example, capturing images of slides, manually identifying which rows contain a sample, and extracting rows from the larger images. Once row identification machine learning model 152 is trained, it may accept as an input a row from an image of a slide, such as a row from a region of interest, and may output a determination as to whether a sample is present and/or a sample presence score, such as a row sample presence score.

Still referring to FIG. 1, in some embodiments, apparatus 100 may identify a point within a row, such as a row identified as described above. In some embodiments, a point may be identified using machine vision. In some embodiments, a point may be identified based on a point within a particular row that has a maximum point sample presence score. As used herein, a "point sample presence score" is a sample presence score where the location is a point. A point sample presence score may be determined, in non-limiting examples, based on a color of a point and/or surrounding pixels, or whether a point is inside or outside potential specimen boundaries (which may be determined, for example, identifying edges within an image and a region of the image enclosed by edges). In another non-limiting example, a point sample presence score may be determined based on the distance between a point and the edge of a slide.

Still referring to FIG. 1, in some embodiments, a point may be identified using point identification machine learning model 156. In some embodiments, point identification machine learning model 156 may be trained using supervised learning. Point identification machine learning model may be trained on a dataset including example points from images of slides, associated with whether a sample is present. Such a dataset may be gathered by, for example, capturing images of slides, manually identifying which points contain a sample, and extracting points from the larger images. Once point identification machine learning model 156 is trained, it may accept as an input a point from an image of a slide, such as a point from a region of interest, and may output a determination as to whether a sample is present and/or a point sample presence score. In some embodiments, apparatus 100 may identify a point from a row based on which one has the highest point sample presence score.

Still referring to FIG. 1, in some embodiments, apparatus 100 may determine an optimal focus at a point, such as a point identified as described above. In some embodiments, optimal focus may be determined using an autofocus mechanism. In some embodiments, optimal focus may be determined using a rangefinder. In some embodiments, actuator mechanism 124 may move optical sensor 120 and/or slide port 140 such that an autofocus mechanism focuses on a desired location. In some embodiments, an autofocus mechanism may be capable of focusing on multiple points within a frame and may select which point to focus on based on a point identified as described above. In some embodiments, one or more camera parameters other than focus may be adjusted to improve focus and/or improve an image. For example, aperture may be adjusted to modify the degree to which a point is in focus. For example, aperture may be adjusted to increase a depth of field such that a point is in focus. An optimal focus may be expressed, in non-limiting examples, as a focus distance or a focus depth.

Still referring to FIG. 1, in some embodiments, apparatus 100 may identify a focus pattern based on an optimal focus and/or a point. An optimal focus and a point may be expressed as a location in 3 dimensional space. For example, X and Y coordinates (horizontal axes) may be determined based on the location of the point on the slide and/or the location of the point on an image. A Z coordinate may be determined based on an optimal focus. For example, a focus distance of an optimal focus may be used as a Z coordinate. As used herein, a "focus pattern" is a pattern that approximates an optimal level of focus at multiple points, including at least one point at which an optimal focus has not been measured. One or more (X,Y,Z) coordinate sets may be used to determine a focus pattern. One or more default parameters may be used to determine a focus pattern (such as defaulting to horizontal where there is insufficient data to determine otherwise). For example, a single (X,Y,Z) coordinate set may be determined, and a focus pattern may be determined as a plane extending horizontally in the X and Y directions, with a Z level remaining constant. In some embodiments, a focus pattern varies in a vertical (Z) direction. For example, two (X,Y,Z) coordinate sets may be determined, and a focus pattern may be determined as including a line between those two (X,Y,Z) locations, and extending horizontally when moving horizontally perpendicular to the line (to form a plane that includes the line). In another example, three (X,Y,Z) coordinate sets may be determined, and a focus pattern may be determined as a plane including all 3 locations. In another example, several (X,Y,Z) coordinate sets may be determined, and a regression algorithm may be used to determine a plane that best fits the coordinate sets. For example, least squares regression may be used. In some embodiments, a focus pattern is not a plane. A focus pattern may include a surface, such as a surface in 3D space. A focus pattern may include one or more curves, bumps, edges, and the like. For example, a focus pattern may include a first plane in a first region, a second plane in a second region, and an edge where the planes intersect. In another example, a focus pattern may include a curved and/or bumpy surface determined such that the Z level of each location on a focus pattern surface is based on the distance to nearby (X,Y,Z) coordinate sets and their Z levels. In another example, a focus pattern may include a plurality of shapes, with (X,Y,Z) coordinate sets as their vertices and lines between (X,Y,Z) coordinate sets as their borders. In some embodiments, a focus pattern may have only one Z value for each (X,Y) coordinate set. In some embodiments, which points have their optimal focus assessed may be determined as a function of, in non-limiting examples, a desired density of points within a region of interest, a likelihood that a sample is present (such as an output from a ML model described above), and/or a user input. For example, a user may manually select a point and/or may input a desired point density. In some embodiments, a focus pattern may be updated as further points are scanned. For example, a focus pattern may be in the shape of a plane based on 10 (X,Y,Z) coordinate sets, and an $11^{th}$ (X,Y,Z) coordinate set may be scanned, and the focus pattern may be recalculated and/or updated to take into account the new coordinate set. In another example, a focus pattern may start as a plane based on a single (X,Y,Z) coordinate set, and may be updated as additional (X,Y,Z) coordinate sets are identified. In some embodiments, a focus pattern may be updated with each additional (X,Y,Z) coordinate set. In some embodiments, a focus pattern may be updated at a rate less than the rate of (X,Y,Z) coordinate set identification. In non-limiting examples, a focus pattern may be updated every 2, 3, 4, 5, or more (X,Y,Z) coordinate sets.

Still referring to FIG. 1, in some embodiments, data used to identify a focus pattern may be filtered. In some embodiments, one or more outliers may be removed. For example, if nearly all (X,Y,Z) points suggest a focus pattern in the shape of a plane, and a single (X,Y,Z) point has a very different Z value than would be estimated from the plane, then that (X,Y,Z) point may be removed. In another example, (X,Y,Z) points identified as focusing on features other than a sample may be removed. For example, (X,Y,Z) points identified as focusing on annotations may be removed.

Still referring to FIG. 1, in some embodiments, a process described above may be used to determine a focus pattern in each region of interest. In regions of interest that contain a sample, this may result in determining a focus pattern based on one or more points that include a sample. This may aid in efficiently identifying a focus pattern such that follow up images may be captured at correct focus distances. In some regions of interest, such as regions of interest that do not contain a sample but instead include features such as annotations, this may result in focusing on a non-sample feature. This may be desirable, for example, because capturing in focus images of features such as annotations may aid professionals in reading annotations and/or may aid optical character recognition processes in transcribing writing. In some regions of interest, both sample and non-sample features may be present; in this case, focusing on a sample may be desirable, and processes described herein may achieve this. In some embodiments, a process described herein may offer a more efficient method of identifying a focus pattern than alternatives. For example, a process described herein may require focusing on fewer points in order to determine a focus pattern.

Still referring to FIG. 1, in some embodiments, a focus pattern, such as a plane, may be identified as a function of a first image and a first position. An (X,Y) position of a point may be determined from the first position. An optimal focus value may be determined from the first image. Together, these may be used to identify an (X,Y,Z) coordinate set which may be used to identify a focus pattern as described herein.

Still referring to FIG. 1, in some embodiments, a focus pattern, such as a Z level of an optimal focus may be used to scan the rest of a row. For example, this may be used to scan the rest of a row including a point at which the optimal focus was identified. In some embodiments, a focus pattern may be used to scan further rows. For example, a focus pattern determined as a function of a Z level of a point may be used to scan rows adjacent to a row including the point. In some embodiments, a focus pattern may be used to scan other rows within the same region of interest. In some embodiments, a focus pattern may be used to scan rows within other regions of interest, such as regions of interest that are nearby.

Still referring to FIG. 1, in some embodiments, region of interest identification, row identification, point identification, and/or focus pattern determination may be done locally. For example, apparatus 100 may include an already trained machine learning model and may apply the model to an image. In some embodiments, region of interest identification, row identification, point identification, and/or focus pattern determination may be done externally. For example, apparatus 100 may transmit image data to another computing device and may receive an output described herein. In some embodiments, a region of interest may be identified, a row may be identified, a point may be identified, and/or a focus pattern may be determined in real time.

Still referring to FIG. 1, in some embodiments, apparatus 100 may determine a scanning pattern. A scanning pattern may be based on, for example, sample morphology. Scanning patterns may include, in non-limiting examples, zig-zag, snake line, and spiral.

Still referring to FIG. 1, in some embodiments, a snake pattern may be used to scan a slide. A snake pattern may progress in any horizontal direction. In non-limiting examples, a snake pattern may progress across the length, or the width, of a slide. In some embodiments, a direction a snake pattern progresses in may be chosen in order to minimize a number of necessary turns. For example, a snake pattern may progress along the shortest dimension of a slide. In another example, a sample shape may be identified, for example, using machine vision, and a snake pattern may progress in a direction according to the shortest dimension of the sample. In some embodiments, a snake pattern may be chosen when high scan speed is desired. In some embodiments, a snake pattern may minimize movement of a camera and/or a slide needed to scan the slide. In some embodiments, a zig-zag pattern may be used to scan a slide. As described with respect to a snake pattern scan, a zig-zag pattern scan may be performed in any horizontal direction, and a direction may be selected in order to minimize a number of turns and/or rows used to scan a slide and/or a feature such as a sample. In some embodiments, a spiral pattern may be used to scan a slide, feature, region of interest, or the like. In some embodiments, a snake pattern and/or a zig-zag pattern may be optimal for Z translation from one row to the next. In some embodiments, a spiral pattern may be optimal for dynamic grid region of interest extension.

Still referring to FIG. 1, in some embodiments, apparatus 100 may extrapolate a focus distance for a second position as a function of a focus pattern. In some embodiments, a focus pattern may be determined as a function of one or more (X,Y,Z) points local to a region of interest and/or a subregion of a region of interest. In some embodiments, a focus pattern such as a plane may be used to approximate an optimal level of focus using extrapolation (such as, rather than interpolation). For example, a focus pattern may be used to approximate an optimal level of focus at an (X,Y) point outside of the range of (X,Y) points already scanned, such as outside of the range of X-values, outside of the range of Y-values, or outside of a shape encompassing the (X,Y) points already scanned. In another example, a focus pattern may be used to approximate an optimal level of focus, where the optimal level of focus includes a Z value outside of the range of Z values used to determine the focus pattern. In another example, an (X,Y,Z) point may be extrapolated to a focus pattern over a row. In some embodiments, one or more additional (X,Y,Z) points may be used to update a focus pattern. In some embodiments, a focus pattern identified for a row may be extrapolated to another row, such as an adjacent row. In another example, a local focus pattern such as a plane may be extrapolated to identify an optimal level of focus outside of a local region. In another example, a focus pattern in a first region of interest may be extrapolated to generate a focus pattern in a second region of interest and/or identify an optimal level of focus at an (X,Y) point in a second region of interest.

Still referring to FIG. 1, in some embodiments, apparatus 100 may capture a second image of a slide at a second position, and at a focus distance based on the focus pattern. For example, if a focus pattern is a plane, and an in-focus image of a particular (X,Y) point is desired, then apparatus 100 may capture an image using a focus distance based on the Z coordinate of the plane at those (X,Y) coordinates. In some embodiments, a first position (such as one at which an optimal focus is measured) and a second position may be set to image locations in the same region of interest. In some embodiments, an actuator mechanism may be mechanically connected to a mobile element; and the actuator mechanism may move the mobile element into the second position. In some embodiments, obtaining a second image may include capturing a plurality of images taken with focus distances based on a focus pattern and constructing the second image from the plurality of images. In some embodiments, a second image may include an image taken as part of a z-stack. Z-stacks are described further below.

Still referring to FIG. 1, in some embodiments, apparatus 100 may determine which regions of interest contain a sample. In some embodiments, this may be applied to a second image, such as a second image taken using a focus distance based on a focus pattern. In some embodiments, which regions of interest may be determined using sample identification machine learning model 160. In some embodiments, sample identification machine learning model 160 may include a classifier. In some embodiments, sample identification machine learning model 160 may be trained using supervised learning. Sample identification machine learning model 160 may be trained on a dataset including example images of slides and/or segments of images of slides, associated with whether a sample is present. Such a dataset may be gathered by, for example, capturing images of slides, and manually identifying ones containing a sample. In some embodiments, multiple machine learning models may be trained to identify different kinds of sample. Once sample identification machine learning model 160 is trained, it may accept as an input an image of a region of interest and may output a determination as to whether a sample is present. In some embodiments, sample identification machine learning model 160 may be improved, such as through use of reinforcement learning. Feedback used to determine a cost function of a reinforcement learning model may include, for example, user inputs, and annotations on a slide. For example, if an annotation, as transcribed using optical character recognition, indicates a particular type of sample, and sample identification machine learning model 160 indicated that no regions of interest contain a sample, then a cost function indicating that the output is false may be determined. In another example, a user may input a label to be associated with a region of interest. If the label indicates a particular type of sample, and sample identification machine learning model 160 output indicated that a sample was present in the region of interest, then a cost function may be determined indicating that the output was correct.

Still referring to FIG. 1, in some embodiments, whether a sample is present may be determined locally. For example, apparatus 100 may include an already trained sample identification machine learning model 160 and may apply the model to an image or segment of an image. In some embodiments, whether a sample is present may be determined externally. For example, apparatus 100 may transmit image data to another computing device and may receive a determination as to whether a sample is present. In some embodiments, whether a sample is present may be determined in real time.

Still referring to FIG. 1, in some embodiments, a machine vision system and/or an optical character recognition system may be used to determine one or more features of sample and/or slide 116. In a non-limiting example, an optical character recognition system may be used to identify writing on slide 116, and this may be used to annotate an image of slide 116.

Still referring to FIG. 1, in some embodiments, apparatus 100 may capture a plurality of images at differing sample focus depths. As used herein, a "sample focus depth" is a depth within a sample that an optical system is in focus. As used herein, a "focus distance" is an object side focal length. In some embodiments, first image and second image may have different focus distances and/or sample focus depths.

Still referring to FIG. 1, in some embodiments, apparatus 100 may include a machine vision system. In some embodiments, a machine vision system may include at least a camera. A machine vision system may use images, such as images from at least a camera, to make a determination about a scene, space, and/or object. For example, in some cases a machine vision system may be used for world modeling or registration of objects within a space. In some cases, registration may include image processing, such as without limitation object recognition, feature detection, edge/corner detection, and the like. Non-limiting example of feature detection may include scale invariant feature transform (SIFT), Canny edge detection, Shi Tomasi corner detection, and the like. In some cases, registration may include one or more transformations to orient a camera frame (or an image or video stream) relative a three-dimensional coordinate system; exemplary transformations include without limitation homography transforms and affine transforms. In an embodiment, registration of first frame to a coordinate system may be verified and/or corrected using object identification and/or computer vision, as described above. For instance, and without limitation, an initial registration to two dimensions, represented for instance as registration to the x and y coordinates, may be performed using a two-dimensional projection of points in three dimensions onto a first frame, however. A third dimension of registration, representing depth and/or a z axis, may be detected by comparison of two frames; for instance, where first frame includes a pair of frames captured using a pair of cameras (e.g., stereoscopic camera also referred to in this disclosure as stereo-camera), image recognition and/or edge detection software may be used to detect a pair of stereoscopic views of images of an object; two stereoscopic views may be compared to derive z-axis values of points on object permitting, for instance, derivation of further z-axis points within and/or around the object using interpolation. This may be repeated with multiple objects in field of view, including without limitation environmental features of interest identified by object classifier and/or indicated by an operator. In an embodiment, x and y axes may be chosen to span a plane common to two cameras used for stereoscopic image capturing and/or an xy plane of a first frame; a result, x and y translational components and ϕ may be pre-populated in translational and rotational matrices, for affine transformation of coordinates of object, also as described above. Initial x and y coordinates and/or guesses at transformational matrices may alternatively or additionally be performed between first frame and second frame, as described above. For each point of a plurality of points on object and/or edge and/or edges of object as described above, x and y coordinates of a first stereoscopic frame may be populated, with an initial estimate of z coordinates based, for instance, on assumptions about object, such as an assumption that ground is substantially parallel to an xy plane as selected above. Z coordinates, and/or x, y, and z coordinates, registered using image capturing and/or object identification processes as described above may then be compared to coordinates predicted using initial guess at transformation matrices; an error function may be computed using by comparing the two sets of points, and new x, y, and/or z coordinates, may be iteratively estimated and compared until the error function drops below a threshold level. In some cases, a machine vision system may use a classifier, such as any classifier described throughout this disclosure.

Still referring to FIG. 1, in some embodiments, image data may be processed using optical character recognition. In some embodiments, optical character recognition or optical character reader (OCR) includes automatic conversion of images of written (e.g., typed, handwritten or printed text) into machine-encoded text. In some cases, recognition of at least a keyword from image data may include one or more processes, including without limitation optical character recognition (OCR), optical word recognition, intelligent character recognition, intelligent word recognition, and the like. In some cases, OCR may recognize written text, one glyph or character at a time. In some cases, optical word recognition may recognize written text, one word at a time, for example, for languages that use a space as a word divider. In some cases, intelligent character recognition (ICR) may recognize written text one glyph or character at a time, for instance by employing machine-learning processes. In some cases, intelligent word recognition (IWR) may recognize written text, one word at a time, for instance by employing machine-learning processes.

Still referring to FIG. 1, in some cases OCR may be an "offline" process, which analyses a static document or image frame. In some cases, handwriting movement analysis can be used as input to handwriting recognition. For example, instead of merely using shapes of glyphs and words, this technique may capture motions, such as the order in which segments are drawn, the direction, and the pattern of putting the pen down and lifting it. This additional information may make handwriting recognition more accurate. In some cases, this technology may be referred to as "online" character recognition, dynamic character recognition, real-time character recognition, and intelligent character recognition.

Still referring to FIG. 1, in some cases, OCR processes may employ pre-processing of image data. Pre-processing process may include without limitation de-skew, de-speckle, binarization, line removal, layout analysis or "zoning," line and word detection, script recognition, character isolation or "segmentation," and normalization. In some cases, a de-skew process may include applying a transform (e.g., homography or affine transform) to image data to align text. In some cases, a de-speckle process may include removing positive and negative spots and/or smoothing edges. In some cases, a binarization process may include converting an image from color or greyscale to black-and-white (i.e., a binary image). Binarization may be performed as a simple way of separating text (or any other desired image component) from a background of image data. In some cases, binarization may be required for example if an employed OCR algorithm only works on binary images. In some cases, a line removal process may include removal of non-glyph or non-character imagery (e.g., boxes and lines). In some cases, a layout analysis or "zoning" process may identify columns, paragraphs, captions, and the like as distinct blocks. In some cases, a line and word detection process may establish a baseline for word and character shapes and separate words, if necessary. In some cases, a script recognition process may, for example in multilingual documents, identify script allowing an appropriate OCR algorithm to be selected. In some cases, a character isolation or "segmentation" process may separate signal characters, for example character-based OCR algorithms. In some cases, a normalization process may normalize aspect ratio and/or scale of image data.

Still referring to FIG. 1, in some embodiments an OCR process may include an OCR algorithm. Exemplary OCR algorithms include matrix matching process and/or feature extraction processes. Matrix matching may involve comparing an image to a stored glyph on a pixel-by-pixel basis. In some case, matrix matching may also be known as "pattern matching," "pattern recognition," and/or "image correlation." Matrix matching may rely on an input glyph being correctly isolated from the rest of image data. Matrix matching may also rely on a stored glyph being in a similar font and at a same scale as input glyph. Matrix matching may work best with typewritten text.

Still referring to FIG. 1, in some embodiments, an OCR process may include a feature extraction process. In some cases, feature extraction may decompose a glyph into at least a feature. Exemplary non-limiting features may include corners, edges, lines, closed loops, line direction, line intersections, and the like. In some cases, feature extraction may reduce dimensionality of representation and may make the recognition process computationally more efficient. In some cases, extracted feature may be compared with an abstract vector-like representation of a character, which might reduce to one or more glyph prototypes. General techniques of feature detection in computer vision are applicable to this type of OCR. In some embodiments, machine-learning processes like nearest neighbor classifiers (e.g., k-nearest neighbors algorithm) may be used to compare image features with stored glyph features and choose a nearest match. OCR may employ any machine-learning process described in this disclosure, for example machine-learning processes described with reference to FIGS. 2-4. Exemplary non-limiting OCR software includes Cuneiform and Tesseract. Cuneiform is a multi-language, open-source optical character recognition system originally developed by Cognitive Technologies of Moscow, Russia. Tesseract is free OCR software originally developed by Hewlett-Packard of Palo Alto, California, United States.

Still referring to FIG. 1, in some cases, OCR may employ a two-pass approach to character recognition. A first pass may try to recognize a character. Each character that is satisfactory is passed to an adaptive classifier as training data. The adaptive classifier then gets a chance to recognize characters more accurately as it further analyzes image data. Since the adaptive classifier may have learned something useful a little too late to recognize characters on the first pass, a second pass is run over the image data. Second pass may include adaptive recognition and use characters recognized with high confidence on the first pass to recognize better remaining characters on the second pass. In some cases, two-pass approach may be advantageous for unusual fonts or low-quality image data. Another exemplary OCR software tool include OCRopus. OCRopus development is led by German Research Centre for Artificial Intelligence in Kaiserslautern, Germany. In some cases, OCR software may employ neural networks.

Still referring to FIG. 1, in some cases, OCR may include post-processing. For example, OCR accuracy may be increased, in some cases, if output is constrained by a lexicon. A lexicon may include a list or set of words that are allowed to occur in a document. In some cases, a lexicon may include, for instance, all the words in the English language, or a more technical lexicon for a specific field. In some cases, an output stream may be a plain text stream or file of characters. In some cases, an OCR process may preserve an original layout of image data. In some cases, near-neighbor analysis can make use of co-occurrence frequencies to correct errors, by noting that certain words are often seen together. For example, "Washington, D.C." is generally far more common in English than "Washington DOC." In some cases, an OCR process may make us of a priori knowledge of grammar for a language being recognized. For example, grammar rules may be used to help determine if a word is likely to be a verb or a noun. Distance conceptualization may be employed for recognition and classification. For example, a Levenshtein distance algorithm may be used in OCR post-processing to further optimize results.

Still referring to FIG. 1, in some embodiments, apparatus 100 may remove an artifact from an image. As used herein, an "artifact" is a visual inaccuracy, an element of an image that distracts from an element of interest, an element of an image that obscures an element of interest, or another undesirable element of an image.

Still referring to FIG. 1, apparatus 100 may include an image processing module. As used in this disclosure, an "image processing module" is a component designed to process digital images. In an embodiment, image processing module may include a plurality of software algorithms that can analyze, manipulate, or otherwise enhance an image, such as, without limitation, a plurality of image processing techniques as described below. In another embodiment, image processing module may include hardware components such as, without limitation, one or more graphics processing units (GPUs) that can accelerate the processing of large amount of images. In some cases, image processing module may be implemented with one or more image processing libraries such as, without limitation, OpenCV, PIL/Pillow, ImageMagick, and the like.

Still referring to FIG. 1, image processing module may be configured to receive images from optical sensor 120. One or more images may be transmitted, from optical sensor 120 to image processing module, via any suitable electronic communication protocol, including without limitation packet-based protocols such as transfer control protocol-internet protocol (TCP-IP), file transfer protocol (FTP) or the like. Receiving images may include retrieval of images from a data store containing images as described below; for instance, and without limitation, images may be retrieved using a query that specifies a timestamp that images may be required to match.

Still referring to FIG. 1, image processing module may be configured to process images. In an embodiment, image processing module may be configured to compress and/or encode images to reduce the file size and storage requirements while maintaining the essential visual information needed for further processing steps as described below. In an embodiment, compression and/or encoding of an image may facilitate faster transmission of images. In some cases, image processing module may be configured to perform a lossless compression on images, wherein the lossless compression may maintain the original image quality of images. In a non-limiting example, image processing module may utilize one or more lossless compression algorithms, such as, without limitation, Huffman coding, Lempel-Ziv-Welch (LZW), Run-Length Encoding (RLE), and/or the like to identify and remove redundancy in images without losing any information. In such embodiment, compressing and/or encoding each image of images may include converting the file format of each image into PNG, GIF, lossless JPEG2000 or the like. In an embodiment, images compressed via lossless compression may be perfectly reconstructed to the original form (e.g., original image resolution, dimension, color representation, format, and the like) of images. In other cases, image processing module may be configured to perform a lossy compression on images, wherein the lossy compression may sacrifice some image quality of images to achieve higher compression ratios. In a non-limiting example, image processing module may utilize one or more lossy compression algorithms, such as, without limitation, Discrete Cosine Transform (DCT) in JPEG or Wavelet Transform in JPEG2000, discard some less significant information within images, resulting in a smaller file size but a slight loss of image quality of images. In such embodiment, compressing and/or encoding images may include converting the file format of each image into JPEG, WebP, lossy JPEG2000, or the like.

Still referring to FIG. 1, in an embodiment, processing images may include determining a degree of quality of depiction of a region of interest of an image. In an embodiment, image processing module may determine a degree of blurriness of images. In a non-limiting example, image processing module may perform a blur detection by taking a Fourier transform, or an approximation such as a Fast Fourier Transform (FFT) of images and analyzing a distribution of low and high frequencies in the resulting frequency-domain depiction of images; for instance, and without limitation, numbers of high-frequency values below a threshold level may indicate blurriness. In another non-limiting example, detection of blurriness may be performed by convolving images, a channel of images, or the like with a Laplacian kernel; for instance, and without limitation, this may generate a numerical score reflecting a number of rapid changes in intensity shown in each image, such that a high score indicates clarity and a low score indicates blurriness. In some cases, blurriness detection may be performed using a Gradient-based operator, which measures operators based on the gradient or first derivative of images, based on the hypothesis that rapid changes indicate sharp edges in the image, and thus are indicative of a lower degree of blurriness. In some cases, blur detection may be performed using Wavelet-based operator, which takes advantage of the capability of coefficients of the discrete wavelet transform to describe the frequency and spatial content of images. In some cases, blur detection may be performed using statistics-based operators take advantage of several image statistics as texture descriptors in order to compute a focus level. In other cases, blur detection may be performed by using discrete cosine transform (DCT) coefficients in order to compute a focus level of images from its frequency content. Additionally, or alternatively, image processing module may be configured to rank images according to degree of quality of depiction of a region of interest and select a highest-ranking image from a plurality of images.

Still referring to FIG. 1, processing images may include enhancing an image or at least a region of interest via a plurality of image processing techniques to improve the quality (or degree of quality of depiction) of an image for better processing and analysis as described further in this disclosure. In an embodiment, image processing module may be configured to perform a noise reduction operation on an image, wherein the noise reduction operation may remove or minimize noise (arises from various sources, such as sensor limitations, poor lighting conditions, image compression, and/or the like), resulting in a cleaner and more visually coherent image. In some cases, noise reduction operation may be performed using one or more image filters; for instance, and without limitation, noise reduction operation may include Gaussian filtering, median filtering, bilateral filtering, and/or the like. Noise reduction operation may be done by image processing module, by averaging or filtering out pixel values in neighborhood of each pixel of an image to reduce random variations.

Still referring to FIG. 1, in another embodiment, image processing module may be configured to perform a contrast enhancement operation on an image. In some cases, an image may exhibit low contrast, which may, for example, make a feature difficult to distinguish from the background. Contrast enhancement operation may improve the contrast of an image by stretching the intensity range of the image and/or redistributing the intensity values (i.e., degree of brightness or darkness of a pixel in the image). In a non-limiting example, intensity value may represent the gray level or color of each pixel, scale from 0 to 255 in intensity range for an 8-bit image, and scale from 0 to 16,777,215 in a 24-bit color image. In some cases, contrast enhancement operation may include, without limitation, histogram equalization, adaptive histogram equalization (CLAHE), contrast stretching, and/or the like. Image processing module may be configured to adjust the brightness and darkness levels within an image to make a feature more distinguishable (i.e., increase degree of quality of depiction). Additionally, or alternatively, image processing module may be configured to perform a brightness normalization operation to correct variations in lighting conditions (i.e., uneven brightness levels). In some cases, an image may include a consistent brightness level across a region after brightness normalization operation performed by image processing module. In a non-limiting example, image processing module may perform a global or local mean normalization, where the average intensity value of an entire image or region of an image may be calculated and used to adjust the brightness levels.

Still referring to FIG. 1, in other embodiments, image processing module may be configured to perform a color space conversion operation to increase degree of quality of depiction. In a non-limiting example, in case of a color image (i.e., RGB image), image processing module may be configured to convert RGB image to grayscale or HSV color space. Such conversion may emphasize the differences in intensity values between a region or feature of interest and the background. Image processing module may further be configured to perform an image sharpening operation such as, without limitation, unsharp masking, Laplacian sharpening, high-pass filtering, and/or the like. Image processing module may use image sharpening operation to enhance the edges and fine details related to a region or feature of interest within an image by emphasizing high-frequency components within an image.

Still referring to FIG. 1, processing images may include isolating a region or feature of interest from the rest of an image as a function of plurality of image processing techniques. Images may include highest-ranking image selected by image processing module as described above. In an embodiment, plurality of image processing techniques may include one or more morphological operations, wherein the morphological operations are techniques developed based on set theory, lattice theory, topology, and random functions used for processing geometrical structures using a structuring element. A "structuring element," for the purpose of this disclosure, is a small matrix or kernel that defines a shape and size of a morphological operation. In some cases, structing element may be centered at each pixel of an image and used to determine an output pixel value for that location. In a non-limiting example, isolating a region or feature of interest from an image may include applying a dilation operation, wherein the dilation operation is a basic morphological operation configured to expand or grow the boundaries of objects (e.g., a cell, a dust particle, and the like) in an image. In another non-limiting example, isolating a region or feature of interest from an image may include applying an erosion operation, wherein the erosion operation is a basic morphological operation configured to shrink or erode the boundaries of objects in an image. In another non-limiting example, isolating a region or feature of interest from an image may include applying an opening operation, wherein the opening operation is a basic morphological operation configured to remove small objects or thin structures from an image while preserving larger structures. In a further non-limiting example, isolating a region or feature of interest from an image may include applying a closing operation, wherein the closing operation is a basic morphological operation configured to fill in small gaps or holes in objects in an image while preserving the overall shape and size of the objects. These morphological operations may be performed by image processing module to enhance the edges of objects, remove noise, or fill gaps in a region or feature of interest before further processing.

Still referring to FIG. 1, in an embodiment, isolating a region or feature of interest from an image may include utilizing an edge detection technique, which may detect one or more shapes defined by edges. An "edge detection technique," as used in this disclosure, includes a mathematical method that identifies points in a digital image, at which the image brightness changes sharply and/or has a discontinuity. In an embodiment, such points may be organized into straight and/or curved line segments, which may be referred to as "edges." Edge detection technique may be performed by image processing module, using any suitable edge detection algorithm, including without limitation Canny edge detection, Sobel operator edge detection, Prewitt operator edge detection, Laplacian operator edge detection, and/or Differential edge detection. Edge detection technique may include phase congruency-based edge detection, which finds all locations of an image where all sinusoids in the frequency domain, for instance as generated using a Fourier decomposition, may have matching phases which may indicate a location of an edge. Edge detection technique may be used to detect a shape of a feature of interest such as a cell, indicating a cell membrane or wall; in an embodiment, edge detection technique may be used to find closed figures formed by edges.

Still referring to FIG. 1, in a non-limiting example, isolating a feature of interest from an image may include determining a feature of interest via edge detection technique. A feature of interest may include a specific area within a digital image that contains information relevant to further processing as described below. In a non-limiting example, an image data located outside a feature of interest may include irrelevant or extraneous information. Such portion of an image containing irrelevant or extraneous information may be disregarded by image processing module, thereby allowing resources to be concentrated at a feature of interest. In some cases, feature of interest may vary in size, shape, and/or location within an image. In a non-limiting example feature of interest may be presented as a circle around the nucleus of a cell. In some cases, feature of interest may specify one or more coordinates, distances and the like, such as center and radius of a circle around the nucleus of a cell in an image. Image processing module may then be configured to isolate feature of interest from the image based on feature of interest. In a non-limiting example, image processing module may crop an image according to a bounding box around a feature of interest.

Still referring to FIG. 1, image processing module may be configured to perform a connected component analysis (CCA) on an image for feature of interest isolation. As used in this disclosure, a "connected component analysis (CCA)," also known as connected component labeling, is an image processing technique used to identify and label connected regions within a binary image (i.e., an image which each pixel having only two possible values: 0 or 1, black or white, or foreground and background). "Connected regions," as described herein, is a group of adjacent pixels that share the same value and are connected based on a predefined neighborhood system such as, without limitation, 4-connected or 8-connected neighborhoods. In some cases, image processing module may convert an image into a binary image via a thresholding process, wherein the thresholding process may involve setting a threshold value that separates the pixels of an image corresponding to feature of interest (foreground) from those corresponding to the background. Pixels with intensity values above the threshold may be set to 1 (white) and those below the threshold may be set to 0 (black). In an embodiment, CCA may be employed to detect and extract feature of interest by identifying a plurality of connected regions that exhibit specific properties or characteristics of the feature of interest. Image processing module may then filter plurality of connected regions by analyzing plurality of connected regions properties such as, without limitation, area, aspect ratio, height, width, perimeter, and/or the like. In a non-limiting example, connected components that closely resemble the dimensions and aspect ratio of feature of interest may be retained, by image processing module as feature of interest, while other components may be discarded. Image processing module may be further configured to extract feature of interest from an image for further processing as described below.

Still referring to FIG. 1, in an embodiment, isolating feature of interest from an image may include segmenting a region depicting a feature of interest into a plurality sub-regions. Segmenting a region into sub-regions may include segmenting a region as a function of feature of interest and/or CCA via an image segmentation process. As used in this disclosure, an "image segmentation process" is a process for partition a digital image into one or more segments, where each segment represents a distinct part of the image. Image segmentation process may change the representation of images. Image segmentation process may be performed by image processing module. In a non-limiting example, image processing module may perform a region-based segmentation, wherein the region-based segmentation involves growing regions from one or more seed points or pixels on an image based on a similarity criterion. Similarity criterion may include, without limitation, color, intensity, texture, and/or the like. In a non-limiting example, region-based segmentation may include region growing, region merging, watershed algorithms, and the like.

Still referring to FIG. 1, in some embodiments, apparatus 100 may remove an artifact identified by a machine vision system or an optical character recognition system, which are described above. Non-limiting examples of artifacts that may be removed include dust particles, bubbles, cracks in slide 116, writing on slide 116, shadows, visual noise such as in a grainy image, and the like. In some embodiments, an artifact may be partially removed and/or lowered in visibility.

Still referring to FIG. 1, in some embodiments, an artifact may be removed using an artifact removal machine learning model. In some embodiments, artifact removal machine learning model may be trained on a dataset including images, associated with images without artifacts. In some embodiments, artifact removal machine learning model may accept as an input an image including an artifact and may output an image without the artifact. For example, artifact removal machine learning model may accept as an input an image including a bubble in a slide and may output an image that does not include the bubble. In some embodiments, artifact removal machine learning model may include a generative machine learning model such as a diffusion model. A diffusion model may learn the structure of a dataset by modeling the way data points diffuse through a latent space. In some embodiments, artifact removal may be done locally. For example, apparatus 100 may include an already trained artifact removal machine learning model and may apply the model to an image. In some embodiments, artifact removal may be done externally. For example, apparatus 100 may transmit image data to another computing device and may receive an image with an artifact removed. In some embodiments, an artifact may be removed in real time. In some embodiments, an artifact may be removed based on identification by a user. For example, a user may drag a box around an artifact using a mouse cursor, and apparatus 100 may remove an artifact in the box.

Still referring to FIG. 1, in some embodiments, apparatus 100 may display an image to a user. In some embodiments, first image may be displayed to a user in real time. In some embodiments, an image may be displayed to a user using output interface 132. For example, first image may be displayed to a user a display such as a screen. In some embodiments, first image may be displayed to a user in the context of a graphical user interface (GUI). For example, a GUI may include controls for navigating an image such as controls for zooming in or out or changing where is being viewed. A GUI may include a touchscreen.

Still referring to FIG. 1, in some embodiments, apparatus 100 may receive a parameter set from a user. As used herein, a "parameter set" is a set of values that identify how an image is to be captured. A parameter set may be implemented as a data structure as described below. In some embodiments, apparatus 100 may receive a parameter set from a user using input interface 128. A parameter set may include X and Y coordinates indicating where the user wishes to view. A parameter set may include a desired level of magnification. As used herein, a "level of magnification" is a datum describing how zoomed in or out an image is to be captured at. A level of magnification may account for optical zoom and/or digital zoom. As a non-limiting example, a level of magnification may be "8×" magnification. A parameter set may include a desired sample focus depth and/or focus distance. In a non-limiting example, user may manipulate input interface 128 such that a parameter set includes X and Y coordinates and a level of magnification corresponding to a more zoomed in view of a particular region of a sample. In some embodiments, a parameter set corresponds to a more zoomed in view of a particular region of a sample that is included in first image. This may be done, for example, to get a more detailed view of a small object. As used herein, unless indicated otherwise, an "X coordinate" and a "Y coordinate" refer to coordinates along perpendicular axes, where the plane defined by these axes is parallel to a plane of a surface of slide 116. In some cases, setting a magnification may include changing one or more optical elements within optical system. For example, setting a magnification may include replacing a first objective lens for a second objective lens having a different magnification. Additionally or alternative, one or more optical components "down beam" from objective lens may be replaced to change a total magnification of optical system and, thereby, set a magnification. In some cases, setting a magnification may include changing a digital magnification. Digital magnification may include outputting an image, using output interface, at a different resolution, i.e. after re-scaling the image. In some embodiments, apparatus 100 may capture an image with a particular field of view. A field of view may be determined based on, for example, a level of magnification, and how wide of an angle a camera captures images at.

Still referring to FIG. 1, in some embodiments, apparatus 100 may move one or more of slide port 140, slide 116, and at least an optical system into a second position. In some embodiments, the location of a second position may be based on a parameter set. In some embodiments, the location of a second position may be based on an identification of a region of interest, row, or point, as described above. Second position may be determined by, for example, modifying the position of optical system relative to slide 116 based on parameter set. For example, parameter set may indicate that second position is achieved by modifying an X coordinate by 5 mm in a particular direction. In this example, second position may be found by modifying optical system's original position by 5 mm in that direction. In some embodiments, such movement may be done using actuator mechanism 124. In some embodiments, actuator mechanism 124 may move slide port 140 such that slide 116 is in a position relative to at least an optical system such that optical sensor 120 may capture an image as directed by parameter set. For example, slide 116 may rest on slide port 140 and movement of slide port 140 may move slide 116 as well. In some embodiments, actuator mechanism 124 may move slide 116 such that slide 116 is in a position relative to at least an optical system such that optical sensor 120 may capture an image as directed by parameter set. For example, slide 116 may be connected to actuator mechanism 124 such that actuator mechanism 124 may move slide 116 relative to at least an optical system. In some embodiments, actuator mechanism 124 may move at least an optical system such that slide 116 is in a position relative to slide 116 such that optical system may capture an image as directed by parameter set. For example, slide 116 may be stationary, and actuator mechanism 124 may move at least an optical system into position relative to slide 116. In some embodiments, actuator mechanism 124 may move more than one of slide port 140, slide 116, and at least an optical system such that they are in the correct relative positions. In some embodiments, actuator mechanism 124 may move slide port 140, slide 116, and/or at least an optical system in real time. For example, user input of a parameter set may cause a substantially immediate movement of items by actuator mechanism 124.

Still referring to FIG. 1, in some embodiments, apparatus 100 may capture a second image of slide 116 at second position. In some embodiments, apparatus 100 may capture second image using at least an optical system. In some embodiments, second image may include an image of a region of a sample. In some embodiments, second image may include an image of a region of an area captured in first image. For example, second image may include a more zoomed in, higher resolution per unit area, image of a region within first image. In another example, second image may be captured using a focus distance based on a focus pattern. This may cause display of second image to allow a user to detect smaller details within the imaged region.

Still referring to FIG. 1, in some embodiments, second image includes a shift in X and Y coordinates relative to first image. For example, second image may partially overlap with first image.

Still referring to FIG. 1, in some embodiments, apparatus 100 may capture second image in real time. For example, user may manipulate input interface 128, creating parameter set, then actuator mechanism 124 may cause movement of slide 116 relative to optical system to start substantially immediately after the input interface 128 was manipulated, then optical system may capture second image substantially immediately after actuator mechanism 124 completes its movement. In some embodiments, artifacts may also be removed in real time. In some embodiments, image may also be annotated in real time. In some embodiments, focus pattern may also be determined in real time and images taken after first image may be taken using a focus distance according to focus pattern.

Still referring to FIG. 1, in some embodiments, apparatus 100 may display second image to user. In some embodiments, second image may be displayed to user using output device. Second image may be displayed as described above with respect to output device and display of first image. In some embodiments, displaying second image to user may include replacing a region of first image with second image to create a hybrid image; and displaying the hybrid image to the user. As used herein, a "hybrid image" is an image constructed by combining a first image with a second image. In some embodiments, creation of a hybrid image in this way may preserve second image. For example, if second image covers a smaller area at a higher resolution per unit area than first image, then second image may replace a lower resolution per unit area segment of first area corresponding to the region covered by second image. In some embodiments, image adjustments may be made to offset visual differences between first image and second image at a border of first image and second image in hybrid image. In a non-limiting example, color may be adjusted such that background color of the images is consistent along the border of the images. As another non-limiting example, brightness of the images may be adjusted such that there is no stark difference between brightness of the images. In some embodiments, artifacts may be removed from second image and/or hybrid image as described above. In some embodiments, second image may be displayed to user in real time. For example, adjustments (such as annotations and/or artifact removal) may be started substantially immediately after second image is captured, and an adjusted version of second image may be displayed to user substantially immediately after adjustments are done. In some embodiments, an unadjusted version of second image may be displayed to user while adjustments are being made. In some embodiments, where there are a plurality of images covering a specific region, when user zooms out using user interface 136, a lower resolution image of the region may be displayed.

Still referring to FIG. 1, in some embodiments, apparatus 100 may transmit first image, second image, hybrid image, and/or a data structure including a plurality of images to an external device. Such an external device may include, in non-limiting examples, a phone, tablet, or computer. In some embodiments, such a transmission may configure the external device to display an image.

Still referring to FIG. 1, in some embodiments, apparatus 100 may annotate an image. In some embodiments, apparatus 100 may annotate first image. In some embodiments, apparatus 100 may annotate second image. In some embodiments, apparatus 100 may annotate hybrid image. For example, upon creation of hybrid image, apparatus 100 may recognize a cell depicted in hybrid image as a cell of a particular type and may annotate hybrid image indicating the cell type. In a non-limiting example, apparatus 100 may associate text with a particular location in an image, where the text describes a feature present at that location in the image. In some embodiments, apparatus 100 may annotate an image selected from the list consisting of first image, second image and hybrid image.

Still referring to FIG. 1, in some embodiments, annotations may be made as a function of user input of an annotation instruction into input interface 128. As used herein, an "annotation instruction" is a datum generated based on user input indicating whether to create an annotation or describing an annotation to be made. For example, user may select an option controlling whether apparatus 100 annotates images. In another example, user may manually annotate an image. In some embodiments, annotations may be made automatically. In some embodiments, annotations may be made using an annotation machine learning model. In some embodiments, annotation machine learning model may include an optical character recognition model, as described above. In some embodiments, annotation machine learning model may be trained using a dataset including image data, associated with text depicted by the image. In some embodiments, annotation machine learning model may accept as an input image data and may output annotated image data and/or annotations to apply to the image data. In some embodiments, annotation machine learning model may be used to convert text written on slides 116 to annotations on images. In some embodiments, annotation machine learning model may include a machine vision model, as described above. In some embodiments, annotation machine learning model including a machine vision model may be trained on a data set including image data, associated with annotations indicating features of the image data. In some embodiments, annotation machine learning model may accept as an input image data and may output annotated image data and/or annotations to apply to image data. Non-limiting examples of features annotation machine learning model may be trained to recognize include cell types, features of cells, and objects in a slide 116 such as bubbles. In some embodiments, images may be annotated in real time. For example, annotation may start substantially immediately after an image is captured and/or a command to annotate an image is received, and annotated image may be displayed to user substantially immediately after annotation is completed.

Still referring to FIG. 1, in some embodiments, apparatus 100 may determine a visual element data structure. In some embodiments, apparatus 100 may display to a user a visual element as a function of visual element data structure. As used herein, a "visual element data structure" is a data structure describing a visual element. As non-limiting examples, visual elements may include first image, second image, hybrid image, and elements of a GUI.

Still referring to FIG. 1, in some embodiments, a visual element data structure may include a visual element. As used herein, a "visual element" is a datum that is displayed visually to a user. In some embodiments, a visual element data structure may include a rule for displaying visual element. In some embodiments, a visual element data structure may be determined as a function of first image, second image, and/or hybrid image. In some embodiments, a visual element data structure may be determined as a function of an item from the list consisting of first image, second image, hybrid image, a GUI element, and an annotation. In a non-limiting example, a visual element data structure may be generated such that visual element describing or a feature of first image, such as an annotation, is displayed to a user.

Still referring to FIG. 1, in some embodiments, visual element may include one or more elements of text, images, shapes, charts, particle effects, interactable features, and the like. As a non-limiting example, a visual element may include a touch screen button for setting magnification level.

Still referring to FIG. 1, a visual element data structure may include rules governing if or when visual element is displayed. In a non-limiting example, a visual element data structure may include a rule causing a visual element including an annotation describing first image, second image, and/or hybrid image to be displayed when a user selects a specific region of first image, second image, and/or hybrid image using a GUI.

Still referring to FIG. 1, a visual element data structure may include rules for presenting more than one visual element, or more than one visual element at a time. In an embodiment, about 1, 2, 3, 4, 5, 10, 20, or 50 visual elements are displayed simultaneously. For example, a plurality of annotations may be displayed simultaneously.

Still referring to FIG. 1, in some embodiments, apparatus 100 may transmit visual element to a display such as output interface 132. A display may communicate visual element to user. A display may include, for example, a smartphone screen, a computer screen, or a tablet screen. A display may be configured to provide a visual interface. A visual interface may include one or more virtual interactive elements such as, without limitation, buttons, menus, and the like. A display may include one or more physical interactive elements, such as buttons, a computer mouse, or a touchscreen, that allow user to input data into the display. Interactive elements may be configured to enable interaction between a user and a computing device. In some embodiments, a visual element data structure is determined as a function of data input by user into a display.

Still referring to FIG. 1, a variable and/or datum described herein may be represented as a data structure. In some embodiments, a data structure may include one or more functions and/or variables, as a class might in object-oriented programming. In some embodiments, a data structure may include data in the form of a Boolean, integer, float, string, date, and the like. In a non-limiting example, an annotation data structure may include a string value representing text of the annotation. In some embodiments, data in a data structure may be organized in a linked list, tree, array, matrix, tenser, and the like. In a non-limiting example, annotation data structures may be organized in an array. In some embodiments, a data structure may include or be associated with one or more elements of metadata. A data structure may include one or more self-referencing data elements, which processor 104 may use in interpreting the data structure. In a non-limiting example, a data structure may include "<date>" and "</date>," tags, indicating that the content between the tags is a date.

Still referring to FIG. 1, a data structure may be stored in, for example, memory 108 or a database. Database may be implemented, without limitation, as a relational database, a key-value retrieval database such as a NOSQL database, or any other format or structure for use as a database that a person skilled in the art would recognize as suitable upon review of the entirety of this disclosure. Database may alternatively or additionally be implemented using a distributed data storage protocol and/or data structure, such as a distributed hash table or the like. Database may include a plurality of data entries and/or records as described above. Data entries in a database may be flagged with or linked to one or more additional elements of information, which may be reflected in data entry cells and/or in linked tables such as tables related by one or more indices in a relational database. Persons skilled in the art, upon reviewing the entirety of this disclosure, will be aware of various ways in which data entries in a database may store, retrieve, organize, and/or reflect data and/or records as used herein, as well as categories and/or populations of data consistently with this disclosure.

Still referring to FIG. 1, in some embodiments, a data structure may be read and/or manipulated by processor 104. In a non-limiting example, an image data structure may be read and displayed to user. In another non-limiting example, an image data structure may be modified to remove an artifact, as described above.

Still referring to FIG. 1, in some embodiments, a data structure may be calibrated. In some embodiments, a data structure may be trained using a machine learning algorithm. In a non-limiting example, a data structure may include an array of data representing the biases of connections of a neural network. In this example, the neural network may be trained on a set of training data, and a back propagation algorithm may be used to modify the data in the array. Machine learning models and neural networks are described further herein.

One or more features of apparatus 100 may be consistent with a feature disclosed in one or more of (A) U.S. patent application Ser. No. 18/217,378, filed on Jul. 25, 2023, and titled "APPARATUS AND A METHOD FOR DETECTING ASSOCIATIONS AMONG DATASETS OF DIFFERENT TYPES," the entirety of which is hereby incorporated by reference; (B) U.S. patent application Ser. No. 18/226,017, filed on Jul. 25, 2023, and titled "APPARATUS AND A METHOD FOR GENERATING A CONFIDENCE SCORE ASSOCIATED WITH A SCANNED LABEL," the entirety of which is hereby incorporated by reference; (C) U.S. patent application Ser. No. 18/226,058, filed on Jul. 25, 2023 and titled "IMAGING DEVICEIMAGING DEVICE AND A METHOD FOR IMAGE GENERATION OF A SPECIMEN," the entirety of which is hereby incorporated by reference; and (D) U.S. patent application Ser. No. 18/226,100, filed on Jul. 25, 2023 and titled "APPARATUS AND METHODS FOR REAL-TIME IMAGE GENERATION," the entirety of which is hereby incorporated by reference.

Figure 2:
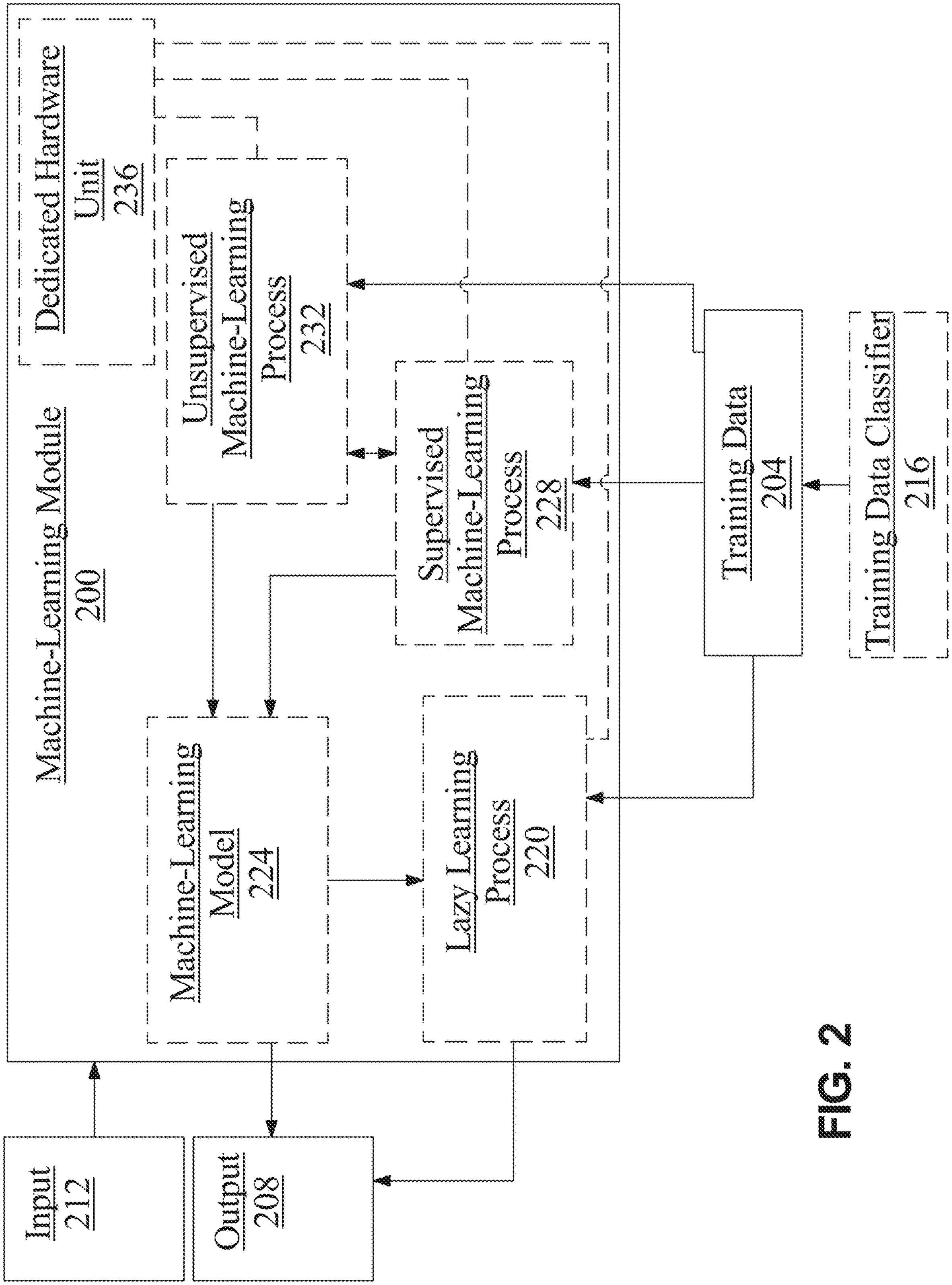
FIG. 2 is a diagram depicting an exemplary machine learning model.

Referring now to FIG. 2, an exemplary embodiment of a machine-learning module 200 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 204 to generate an algorithm instantiated in hardware or software logic, data structures, and/or functions that will be performed by a computing device/module to produce outputs 208 given data provided as inputs 212; this is in contrast to a non-machine learning software program where the commands to be executed are determined in advance by a user and written in a programming language.

Still referring to FIG. 2, "training data," as used herein, is data containing correlations that a machine-learning process may use to model relationships between two or more categories of data elements. For instance, and without limitation, training data 204 may include a plurality of data entries, also known as "training examples," each entry representing a set of data elements that were recorded, received, and/or generated together; data elements may be correlated by shared existence in a given data entry, by proximity in a given data entry, or the like. Multiple data entries in training data 204 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 204 according to various correlations; correlations may indicate causative and/or predictive links between categories of data elements, which may be modeled as relationships such as mathematical relationships by machine-learning processes as described in further detail below. Training data 204 may be formatted and/or organized by categories of data elements, for instance by associating data elements with one or more descriptors corresponding to categories of data elements. As a non-limiting example, training data 204 may include data entered in standardized forms by persons or processes, such that entry of a given data element in a given field in a form may be mapped to one or more descriptors of categories. Elements in training data 204 may be linked to descriptors of categories by tags, tokens, or other data elements; for instance, and without limitation, training data 204 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 2, training data 204 may include one or more elements that are not categorized; that is, training data 204 may not be formatted or contain descriptors for some elements of data. Machine-learning algorithms and/or other processes may sort training data 204 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 204 to be made applicable for two or more distinct machine-learning algorithms as described in further detail below. Training data 204 used by machine-learning module 200 may correlate any input data as described in this disclosure to any output data as described in this disclosure. As a non-limiting illustrative example, inputs may include images of regions of interest, and outputs may include determinations as to whether a sample is present.

Further referring to FIG. 2, training data may be filtered, sorted, and/or selected using one or more supervised and/or unsupervised machine-learning processes and/or models as described in further detail below; such models may include without limitation a training data classifier 216. Training data classifier 216 may include a "classifier," which as used in this disclosure is a machine-learning model as defined below, such as a data structure representing and/or using a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. A distance metric may include any norm, such as, without limitation, a Pythagorean norm. Machine-learning module 200 may generate a classifier using a classification algorithm, defined as a processes whereby a computing device and/or any module and/or component operating thereon derives a classifier from training data 204. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 216 may classify elements of training data to whether or not a sample is present.

With further reference to FIG. 2, training examples for use as training data may be selected from a population of potential examples according to cohorts relevant to an analytical problem to be solved, a classification task, or the like. Alternatively or additionally, training data may be selected to span a set of likely circumstances or inputs for a machine-learning model and/or process to encounter when deployed. For instance, and without limitation, for each category of input data to a machine-learning process or model that may exist in a range of values in a population of phenomena such as images, user data, process data, physical data, or the like, a computing device, processor, and/or machine-learning model may select training examples representing each possible value on such a range and/or a representative sample of values on such a range. Selection of a representative sample may include selection of training examples in proportions matching a statistically determined and/or predicted distribution of such values according to relative frequency, such that, for instance, values encountered more frequently in a population of data so analyzed are represented by more training examples than values that are encountered less frequently. Alternatively or additionally, a set of training examples may be compared to a collection of representative values in a database and/or presented to a user, so that a process can detect, automatically or via user input, one or more values that are not included in the set of training examples. Computing device, processor, and/or module may automatically generate a missing training example; this may be done by receiving and/or retrieving a missing input and/or output value and correlating the missing input and/or output value with a corresponding output and/or input value collocated in a data record with the retrieved value, provided by a user and/or other device, or the like.

Still referring to FIG. 2, computer, processor, and/or module may be configured to sanitize training data. "Sanitizing" training data, as used in this disclosure, is a process whereby training examples are removed that interfere with convergence of a machine-learning model and/or process to a useful result. For instance, and without limitation, a training example may include an input and/or output value that is an outlier from typically encountered values, such that a machine-learning algorithm using the training example will be adapted to an unlikely amount as an input and/or output; a value that is more than a threshold number of standard deviations away from an average, mean, or expected value, for instance, may be eliminated. Alternatively or additionally, one or more training examples may be identified as having poor quality data, where "poor quality" is defined as having a signal to noise ratio below a threshold value.

As a non-limiting example, and with further reference to FIG. 2, images used to train an image classifier or other machine-learning model and/or process that takes images as inputs or generates images as outputs may be rejected if image quality is below a threshold value. For instance, and without limitation, computing device, processor, and/or module may perform blur detection, and eliminate one or more Blur detection may be performed, as a non-limiting example, by taking Fourier transform, or an approximation such as a Fast Fourier Transform (FFT) of the image and analyzing a distribution of low and high frequencies in the resulting frequency-domain depiction of the image; numbers of high-frequency values below a threshold level may indicate blurriness. As a further non-limiting example, detection of blurriness may be performed by convolving an image, a channel of an image, or the like with a Laplacian kernel; this may generate a numerical score reflecting a number of rapid changes in intensity shown in the image, such that a high score indicates clarity and a low score indicates blurriness. Blurriness detection may be performed using a gradient-based operator, which measures operators based on the gradient or first derivative of an image, based on the hypothesis that rapid changes indicate sharp edges in the image, and thus are indicative of a lower degree of blurriness. Blur detection may be performed using Wavelet-based operator, which takes advantage of the capability of coefficients of the discrete wavelet transform to describe the frequency and spatial content of images. Blur detection may be performed using statistics-based operators take advantage of several image statistics as texture descriptors in order to compute a focus level. Blur detection may be performed by using discrete cosine transform (DCT) coefficients in order to compute a focus level of an image from its frequency content.

Continuing to refer to FIG. 2, computing device, processor, and/or module may be configured to precondition one or more training examples. For instance, and without limitation, where a machine learning model and/or process has one or more inputs and/or outputs requiring, transmitting, or receiving a certain number of bits, samples, or other units of data, one or more training examples' elements to be used as or compared to inputs and/or outputs may be modified to have such a number of units of data. For instance, a computing device, processor, and/or module may convert a smaller number of units, such as in a low pixel count image, into a desired number of units, for instance by upsampling and interpolating. As a non-limiting example, a low pixel count image may have 100 pixels, however a desired number of pixels may be 128. Processor may interpolate the low pixel count image to convert the 100 pixels into 128 pixels. It should also be noted that one of ordinary skill in the art, upon reading this disclosure, would know the various methods to interpolate a smaller number of data units such as samples, pixels, bits, or the like to a desired number of such units. In some instances, a set of interpolation rules may be trained by sets of highly detailed inputs and/or outputs and corresponding inputs and/or outputs downsampled to smaller numbers of units, and a neural network or other machine learning model that is trained to predict interpolated pixel values using the training data. As a non-limiting example, a sample input and/or output, such as a sample picture, with sample-expanded data units (e.g., pixels added between the original pixels) may be input to a neural network or machine-learning model and output a pseudo replica sample-picture with dummy values assigned to pixels between the original pixels based on a set of interpolation rules. As a non-limiting example, in the context of an image classifier, a machine-learning model may have a set of interpolation rules trained by sets of highly detailed images and images that have been downsampled to smaller numbers of pixels, and a neural network or other machine learning model that is trained using those examples to predict interpolated pixel values in a facial picture context. As a result, an input with sample-expanded data units (the ones added between the original data units, with dummy values) may be run through a trained neural network and/or model, which may fill in values to replace the dummy values. Alternatively or additionally, processor, computing device, and/or module may utilize sample expander methods, a low-pass filter, or both. As used in this disclosure, a "low-pass filter" is a filter that passes signals with a frequency lower than a selected cutoff frequency and attenuates signals with frequencies higher than the cutoff frequency. The exact frequency response of the filter depends on the filter design. Computing device, processor, and/or module may use averaging, such as luma or chroma averaging in images, to fill in data units in between original data units.

In some embodiments, and with continued reference to FIG. 2, computing device, processor, and/or module may down-sample elements of a training example to a desired lower number of data elements. As a non-limiting example, a high pixel count image may have 256 pixels, however a desired number of pixels may be 128. Processor may down-sample the high pixel count image to convert the 256 pixels into 128 pixels. In some embodiments, processor may be configured to perform downsampling on data. Downsampling, also known as decimation, may include removing every Nth entry in a sequence of samples, all but every Nth entry, or the like, which is a process known as "compression," and may be performed, for instance by an N-sample compressor implemented using hardware or software. Anti-aliasing and/or anti-imaging filters, and/or low-pass filters, may be used to clean up side-effects of compression.

Still referring to FIG. 2, machine-learning module 200 may be configured to perform a lazy-learning process 220 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 204. Heuristic may include selecting some number of highest-ranking associations and/or training data 204 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 2, machine-learning processes as described in this disclosure may be used to generate machine-learning models 224. A "machine-learning model," as used in this disclosure, is a data structure representing and/or instantiating a mathematical and/or algorithmic representation of a relationship between inputs and outputs, as generated using any machine-learning process including without limitation any process as described above, and stored in memory; an input is submitted to a machine-learning model 224 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 224 may be generated by creating an artificial neural network, such as a convolutional neural network comprising an input layer of nodes, one or more intermediate layers, and an output layer of nodes. Connections between nodes may be created via the process of "training" the network, in which elements from a training data 204 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 2, machine-learning algorithms may include at least a supervised machine-learning process 228. At least a supervised machine-learning process 228, as defined herein, include algorithms that receive a training set relating a number of inputs to a number of outputs, and seek to generate one or more data structures representing and/or instantiating one or more mathematical relations relating inputs to outputs, where each of the one or more mathematical relations is optimal according to some criterion specified to the algorithm using some scoring function. For instance, a supervised learning algorithm may include images of regions of interest as described above as inputs, determinations as to whether a sample is present as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 204. Persons skilled in the art, upon reviewing the entirety of this disclosure, will be aware of various possible variations of at least a supervised machine-learning process 228 that may be used to determine relation between inputs and outputs. Supervised machine-learning processes may include classification algorithms as defined above.

With further reference to FIG. 2, training a supervised machine-learning process may include, without limitation, iteratively updating coefficients, biases, weights based on an error function, expected loss, and/or risk function. For instance, an output generated by a supervised machine-learning model using an input example in a training example may be compared to an output example from the training example; an error function may be generated based on the comparison, which may include any error function suitable for use with any machine-learning algorithm described in this disclosure, including a square of a difference between one or more sets of compared values or the like. Such an error function may be used in turn to update one or more weights, biases, coefficients, or other parameters of a machine-learning model through any suitable process including without limitation gradient descent processes, least-squares processes, and/or other processes described in this disclosure. This may be done iteratively and/or recursively to gradually tune such weights, biases, coefficients, or other parameters. Updating may be performed, in neural networks, using one or more back-propagation algorithms. Iterative and/or recursive updates to weights, biases, coefficients, or other parameters as described above may be performed until currently available training data is exhausted and/or until a convergence test is passed, where a "convergence test" is a test for a condition selected as indicating that a model and/or weights, biases, coefficients, or other parameters thereof has reached a degree of accuracy. A convergence test may, for instance, compare a difference between two or more successive errors or error function values, where differences below a threshold amount may be taken to indicate convergence. Alternatively or additionally, one or more errors and/or error function values evaluated in training iterations may be compared to a threshold.

Still referring to FIG. 2, a computing device, processor, and/or module may be configured to perform method, method step, sequence of method steps and/or algorithm described in reference to this figure, in any order and with any degree of repetition. For instance, a computing device, processor, and/or module may be configured to perform a single step, sequence and/or algorithm repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. A computing device, processor, and/or module may perform any step, sequence of steps, or algorithm in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Further referring to FIG. 2, machine learning processes may include at least an unsupervised machine-learning processes 232. An unsupervised machine-learning process, as used herein, is a process that derives inferences in datasets without regard to labels; as a result, an unsupervised machine-learning process may be free to discover any structure, relationship, and/or correlation provided in the data. Unsupervised processes 232 may not require a response variable; unsupervised processes 232 may be used to find interesting patterns and/or inferences between variables, to determine a degree of correlation between two or more variables, or the like.

Still referring to FIG. 2, machine-learning module 200 may be designed and configured to create a machine-learning model 224 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 2, machine-learning algorithms may include, without limitation, linear discriminant analysis. Machine-learning algorithm may include quadratic discriminant analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized trees, AdaBoost, gradient tree boosting, and/or voting classifier methods. Machine-learning algorithms may include neural net algorithms, including convolutional neural net processes.

Still referring to FIG. 2, a machine-learning model and/or process may be deployed or instantiated by incorporation into a program, apparatus, system and/or module. For instance, and without limitation, a machine-learning model, neural network, and/or some or all parameters thereof may be stored and/or deployed in any memory or circuitry. Parameters such as coefficients, weights, and/or biases may be stored as circuit-based constants, such as arrays of wires and/or binary inputs and/or outputs set at logic "1" and "0" voltage levels in a logic circuit to represent a number according to any suitable encoding system including twos complement or the like or may be stored in any volatile and/or non-volatile memory. Similarly, mathematical operations and input and/or output of data to or from models, neural network layers, or the like may be instantiated in hardware circuitry and/or in the form of instructions in firmware, machine-code such as binary operation code instructions, assembly language, or any higher-order programming language. Any technology for hardware and/or software instantiation of memory, instructions, data structures, and/or algorithms may be used to instantiate a machine-learning process and/or model, including without limitation any combination of production and/or configuration of non-reconfigurable hardware elements, circuits, and/or modules such as without limitation ASICs, production and/or configuration of reconfigurable hardware elements, circuits, and/or modules such as without limitation FPGAs, production and/or of non-reconfigurable and/or configuration non-rewritable memory elements, circuits, and/or modules such as without limitation non-rewritable ROM, production and/or configuration of reconfigurable and/or rewritable memory elements, circuits, and/or modules such as without limitation rewritable ROM or other memory technology described in this disclosure, and/or production and/or configuration of any computing device and/or component thereof as described in this disclosure. Such deployed and/or instantiated machine-learning model and/or algorithm may receive inputs from any other process, module, and/or component described in this disclosure, and produce outputs to any other process, module, and/or component described in this disclosure.

Continuing to refer to FIG. 2, any process of training, retraining, deployment, and/or instantiation of any machine-learning model and/or algorithm may be performed and/or repeated after an initial deployment and/or instantiation to correct, refine, and/or improve the machine-learning model and/or algorithm. Such retraining, deployment, and/or instantiation may be performed as a periodic or regular process, such as retraining, deployment, and/or instantiation at regular elapsed time periods, after some measure of volume such as a number of bytes or other measures of data processed, a number of uses or performances of processes described in this disclosure, or the like, and/or according to a software, firmware, or other update schedule. Alternatively or additionally, retraining, deployment, and/or instantiation may be event-based, and may be triggered, without limitation, by user inputs indicating sub-optimal or otherwise problematic performance and/or by automated field testing and/or auditing processes, which may compare outputs of machine-learning models and/or algorithms, and/or errors and/or error functions thereof, to any thresholds, convergence tests, or the like, and/or may compare outputs of processes described herein to similar thresholds, convergence tests or the like. Event-based retraining, deployment, and/or instantiation may alternatively or additionally be triggered by receipt and/or generation of one or more new training examples; a number of new training examples may be compared to a preconfigured threshold, where exceeding the preconfigured threshold may trigger retraining, deployment, and/or instantiation.

Still referring to FIG. 2, retraining and/or additional training may be performed using any process for training described above, using any currently or previously deployed version of a machine-learning model and/or algorithm as a starting point. Training data for retraining may be collected, preconditioned, sorted, classified, sanitized or otherwise processed according to any process described in this disclosure. Training data may include, without limitation, training examples including inputs and correlated outputs used, received, and/or generated from any version of any system, module, machine-learning model or algorithm, apparatus, and/or method described in this disclosure; such examples may be modified and/or labeled according to user feedback or other processes to indicate desired results, and/or may have actual or measured results from a process being modeled and/or predicted by system, module, machine-learning model or algorithm, apparatus, and/or method as "desired" results to be compared to outputs for training processes as described above.

Redeployment may be performed using any reconfiguring and/or rewriting of reconfigurable and/or rewritable circuit and/or memory elements; alternatively, redeployment may be performed by production of new hardware and/or software components, circuits, instructions, or the like, which may be added to and/or may replace existing hardware and/or software components, circuits, instructions, or the like.

Further referring to FIG. 2, one or more processes or algorithms described above may be performed by at least a dedicated hardware unit 236. A "dedicated hardware unit," for the purposes of this figure, is a hardware component, circuit, or the like, aside from a principal control circuit and/or processor performing method steps as described in this disclosure, that is specifically designated or selected to perform one or more specific tasks and/or processes described in reference to this figure, such as without limitation preconditioning and/or sanitization of training data and/or training a machine-learning algorithm and/or model. A dedicated hardware unit 236 may include, without limitation, a hardware unit that can perform iterative or massed calculations, such as matrix-based calculations to update or tune parameters, weights, coefficients, and/or biases of machine-learning models and/or neural networks, efficiently using pipelining, parallel processing, or the like; such a hardware unit may be optimized for such processes by, for instance, including dedicated circuitry for matrix and/or signal processing operations that includes, e.g., multiple arithmetic and/or logical circuit units such as multipliers and/or adders that can act simultaneously and/or in parallel or the like. Such dedicated hardware units 236 may include, without limitation, graphical processing units (GPUs), dedicated signal processing modules, FPGA or other reconfigurable hardware that has been configured to instantiate parallel processing units for one or more specific tasks, or the like, A computing device, processor, apparatus, or module may be configured to instruct one or more dedicated hardware units 236 to perform one or more operations described herein, such as evaluation of model and/or algorithm outputs, one-time or iterative updates to parameters, coefficients, weights, and/or biases, and/or any other operations such as vector and/or matrix operations as described in this disclosure.

Figure 3:
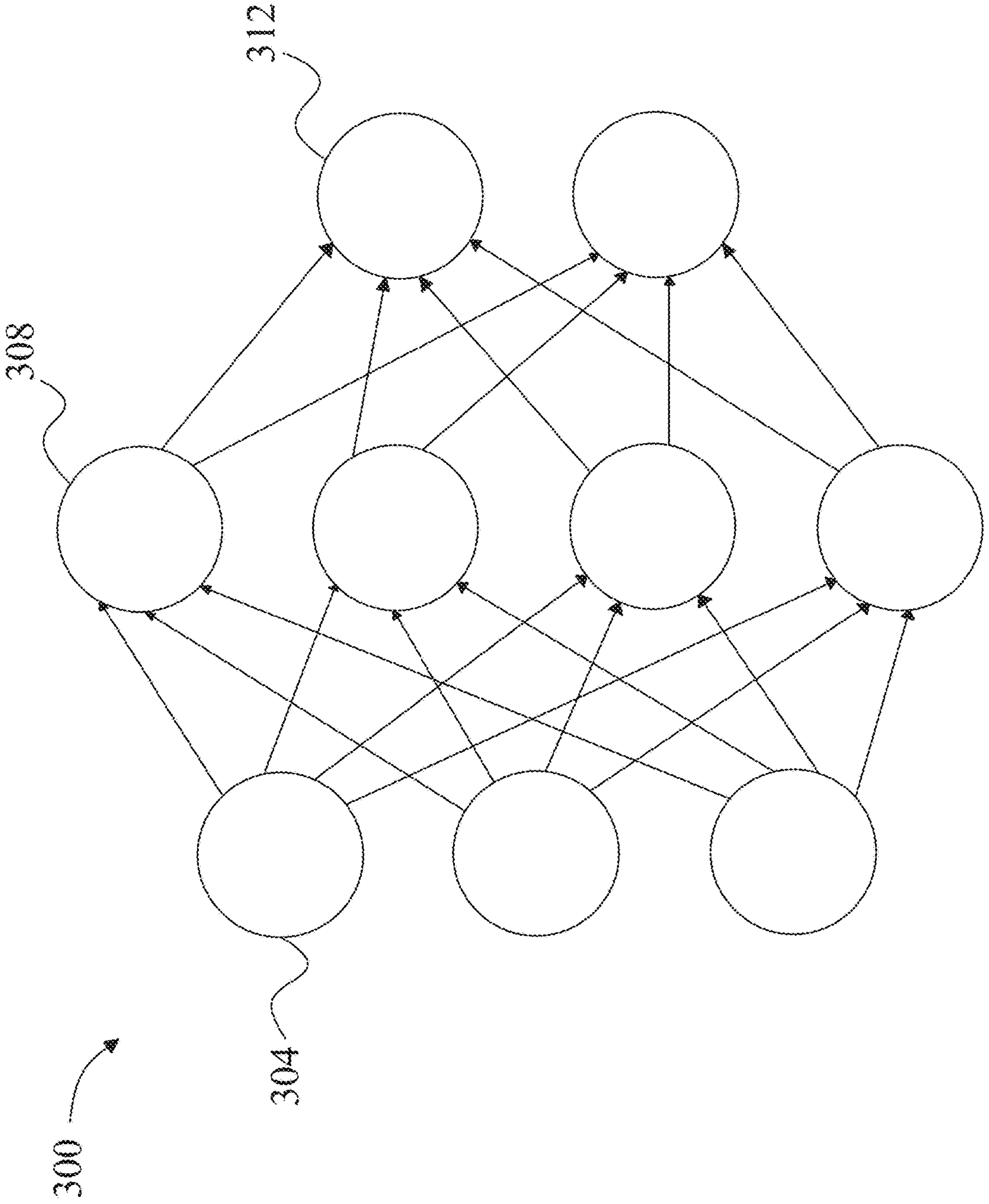
FIG. 3 is a diagram depicting an exemplary neural network.

Referring now to FIG. 3, an exemplary embodiment of neural network 300 is illustrated. A neural network 300 also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes 304, one or more intermediate layers 308, and an output layer of nodes 312. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning. Connections may run solely from input nodes toward output nodes in a "feed-forward" network, or may feed outputs of one layer back to inputs of the same or a different layer in a "recurrent network." As a further non-limiting example, a neural network may include a convolutional neural network comprising an input layer of nodes, one or more intermediate layers, and an output layer of nodes. A "convolutional neural network," as used in this disclosure, is a neural network in which at least one hidden layer is a convolutional layer that convolves inputs to that layer with a subset of inputs known as a "kernel," along with one or more additional layers such as pooling layers, fully connected layers, and the like.

Figure 4:
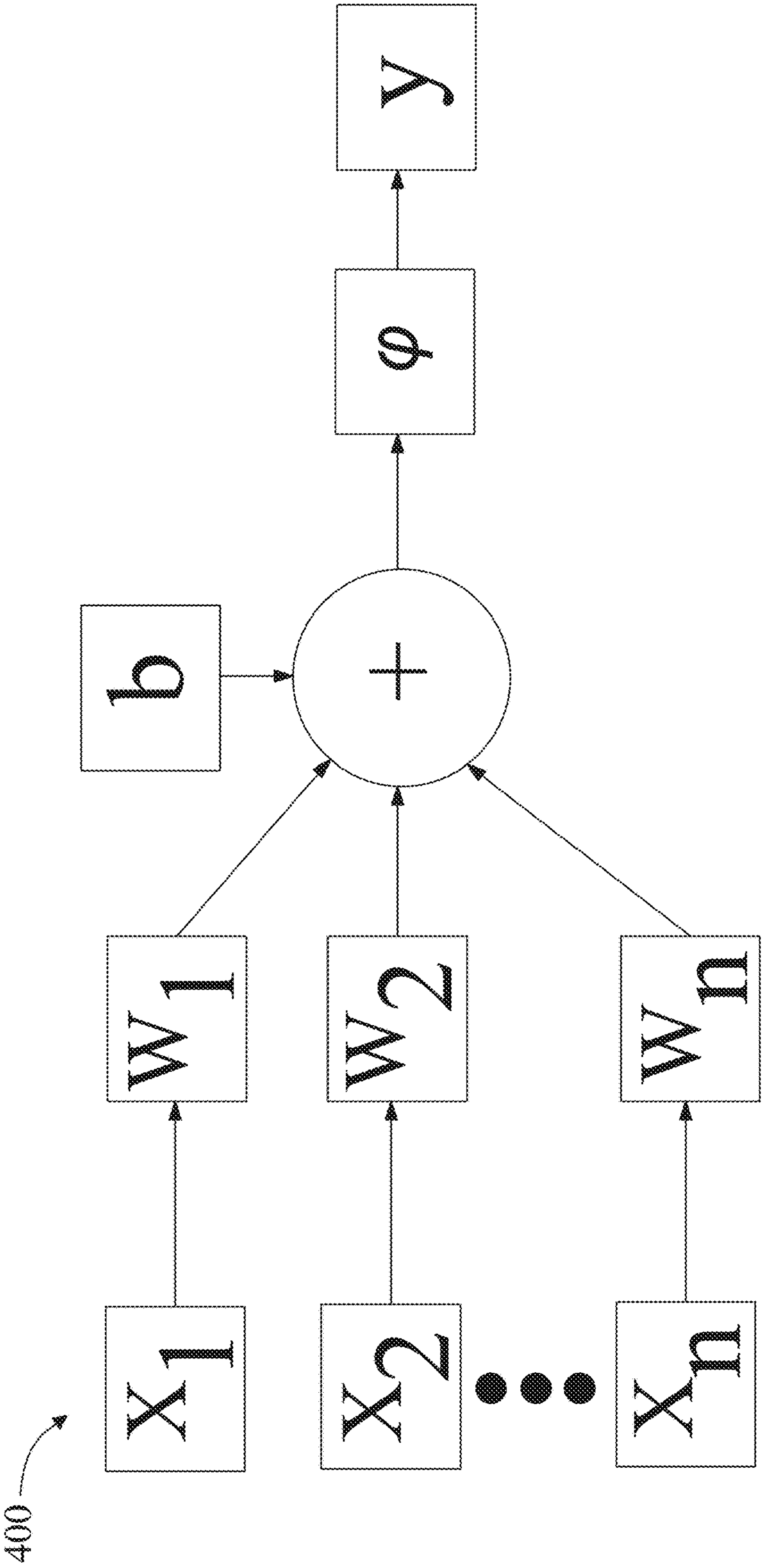
FIG. 4 is a diagram depicting an exemplary neural network node.

Referring now to FIG. 4, an exemplary embodiment of a node 400 of a neural network is illustrated. A node may include, without limitation, a plurality of inputs xi that may receive numerical values from inputs to a neural network containing the node and/or from other nodes. Node may perform one or more activation functions to produce its output given one or more inputs, such as without limitation computing a binary step function comparing an input to a threshold value and outputting either a logic 1 or logic 0 output or something equivalent, a linear activation function whereby an output is directly proportional to the input, and/or a non-linear activation function, wherein the output is not proportional to the input. Non-linear activation functions may include, without limitation, a sigmoid function of the form $$f(x) = \frac{1}{1 - e^{-x}}$$

given input x, a tanh (hyperbolic tangent) function, of the form $$\frac{e^{x} - e^{-x}}{e^{x} + e^{-x}},$$

a tanh derivative function such as $f(x)=\tanh^2(x)$, a rectified linear unit function such as $f(x)=\max(0, x)$, a "leaky" and/or "parametric" rectified linear unit function such as $f(x)=\max(\alpha x, x)$ for some $\alpha$, an exponential linear units function such as $$f(x) = \begin{cases} x & \text{for } x \ge 0 \\ \alpha(e^{x} - 1) & \text{for } x < 0 \end{cases}$$

for some value of $\alpha$ (this function may be replaced and/or weighted by its own derivative in some embodiments), a softmax function such as $$f(x_i) = \frac{e^{x}}{\sum_i x_i}$$

where the inputs to an instant layer are $x_i$, a swish function such as $f(x)=x*\text{sigmoid}(x)$, a Gaussian error linear unit function such as $f(x)=\alpha(1+\tanh(\sqrt{2/\pi}(x+bx^r)))$ for some values of a, b, and r, and/or a scaled exponential linear unit function such as $$f(x) = \lambda \begin{cases} \alpha(e^{x} - 1) & \text{for } x < 0 \\ x & \text{for } x \ge 0 \end{cases}.$$

Fundamentally, there is no limit to the nature of functions of inputs xi that may be used as activation functions. As a non-limiting and illustrative example, node may perform a weighted sum of inputs using weights $w_i$ that are multiplied by respective inputs xi. Additionally or alternatively, a bias b may be added to the weighted sum of the inputs such that an offset is added to each unit in the neural network layer that is independent of the input to the layer. The weighted sum may then be input into a function $\varphi$, which may generate one or more outputs y. Weight $w_i$ applied to an input $x_i$ may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$ may be determined by training a neural network using training data, which may be performed using any suitable process as described above.

Still referring to FIG. 4, a "convolutional neural network," as used in this disclosure, is a neural network in which at least one hidden layer is a convolutional layer that convolves inputs to that layer with a subset of inputs known as a "kernel," along with one or more additional layers such as pooling layers, fully connected layers, and the like. CNN may include, without limitation, a deep neural network (DNN) extension, where a DNN is defined as a neural network with two or more hidden layers.

Still referring to FIG. 4, in some embodiments, a convolutional neural network may learn from images. In non-limiting examples, a convolutional neural network may perform tasks such as classifying images, detecting objects depicted in an image, segmenting an image, and/or processing an image. In some embodiments, a convolutional neural network may operate such that each node in an input layer is only connected to a region of nodes in a hidden layer. In some embodiments, the regions in aggregate may create a feature map from an input layer to the hidden layer. In some embodiments, a convolutional neural network may include a layer in which the weights and biases for all nodes are the same. In some embodiments, this may allow a convolutional neural network to detect a feature, such as an edge, across different locations in an image.

Figure 5:
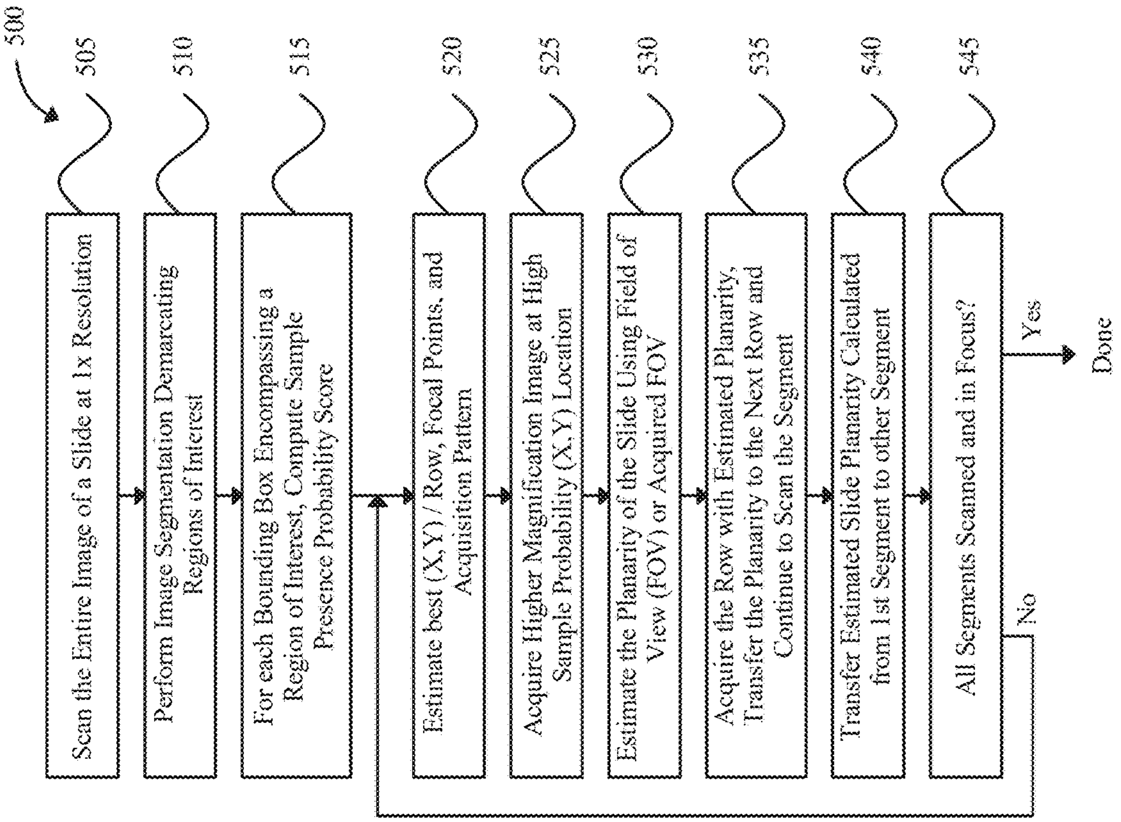
FIG. 5 is a diagram depicting an exemplary method of slide imaging.

Referring now to FIG. 5, an exemplary embodiment of a method 500 of slide imaging is illustrated. This may aid in reducing out-of-focus errors. At step 505, the entire slide image may be captured at a low resolution (e.g. 1$x$). At step 510, image segmentation may be performed to detect regions where any substance is present. This may demarcate all regions including regions of debris, pen mark, printed text (such as annotations) on a slide, with bounding boxes. At step 515, for each bounding box encompassing a region of interest, a sample presence probability score may be computed. This may be performed by a variety of algorithms such as K means, NLMD (non-local means denoising), features such as Hue color space, and the like for each row, and segmentation models such as U-Net. This may be used to find the best row 520. A best row may include a row that is flanked by rows above and below whose combined weighted score is the highest score for the presence of a sample. Once the best row is determined, the best (x,y) location may be determined. The best (x,y) location may include an (x,y) point that maximizes the probability of sample presence at the point from the specimen boundaries, color, etc. The optimal focus for that bounding box may be determined by collecting the z-stack at the best (x,y) point 525. As used herein, a "z-stack" is a plurality of images at a particular (x,y) location, at varying focus distances. In some embodiments, a z-stack may have a height less than the height of a slide. In some embodiments, a z-stack may include 2, 3, 4, 5, 6, 7, 8, 9, 10, or more images captured at varying focus distances. In some embodiments, images captured as part of a z-stack may be less than a millimeter apart. Capturing fewer images may improve efficiency, for example, because it may be faster. Capturing images close together may allow for high precision in determining an optimal focus distance. In some embodiments, these factors may make it desirable to capture relatively few images over a relatively small height. This may raise the importance of selecting a focus distance to capture a z-stack such that an object to be focused on is positioned within the height of the z-stack. A focus pattern may be used to estimate a focus distance at an (x,y) location where a z-stack is to be captured at. Use of such an estimate may improve the consistency with which an object to be focused on is within the height of a z-stack. In some embodiments, a z-stack distance may be identified and/or captured using a planarity of a field of view of a camera and/or at least two points along that row.

Such planarity may include a focus pattern as described herein. At steps 530 and 535, that z-level may be used to scan the row and identify a focus pattern such as a plane. A focus pattern such as a plane may be identified using a set of points along a row as a function of an optimal focus of a point in that row. Such a plane may be used to estimate focus distances at other locations such a location in an adjacent row. Such a plane may be recalculated based on additional data as new data is obtained. For example, an optimal focus may be identified at an additional point, and a plane may be updated based on this additional data. Such a plane may also be used to estimate a focus distance in another region of interest 540. This procedure may be repeated for all regions of interest in the slide 545.

Figure 6A:
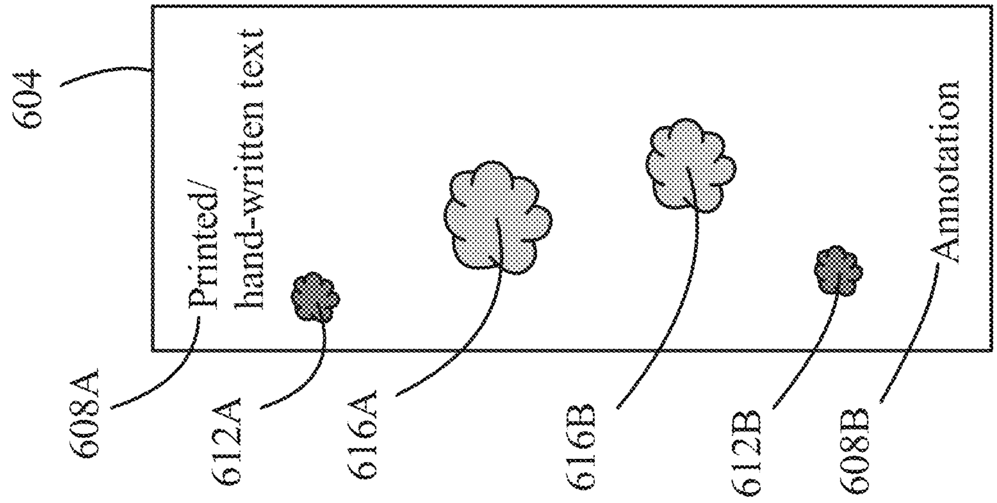
FIG. 6A-C are diagrams depicting a slide including various features, identifications of regions of interest, and scanning of rows within the regions of interest.
Figure 6B:
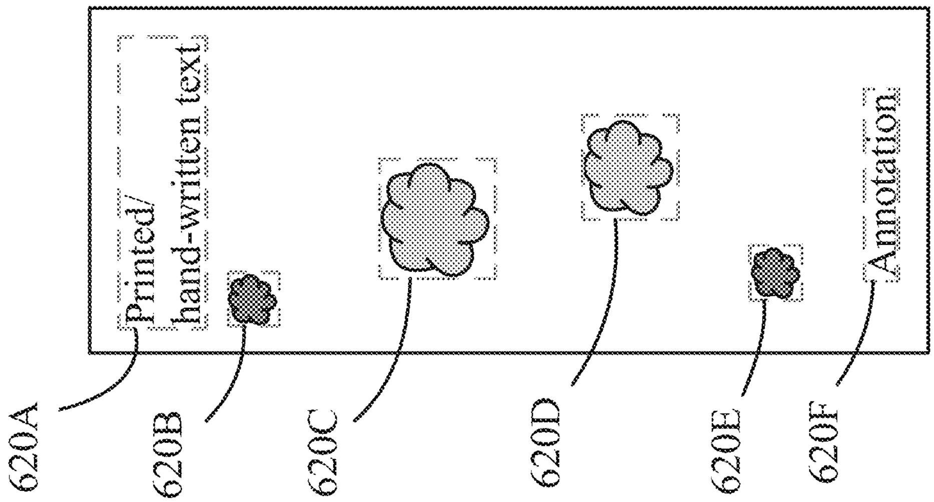
Figure 6C:
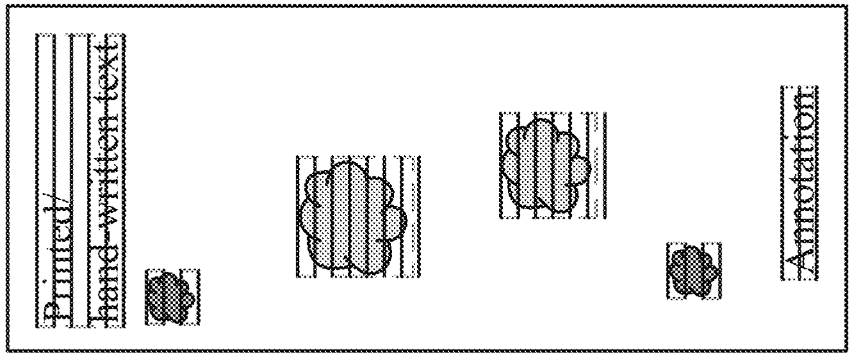

Referring now to FIG. 6A-C, a slide progressing through various steps described herein is illustrated. A slide 604 may contain annotations 608A-B, debris 612A-B, and sample 616A-B. Steps described herein may address a challenge of choosing a correct focus for a region where a sample is present despite the presence of debris and annotations. Segmenting slide 604 into separate regions of interest 620A-F enables scanning each segment with a different focus optimal to that region. This makes the focus determination independent of the spatial distribution of the sample, debris, and annotations. In some embodiments, image classification for detecting debris and annotations to avoid scanning may be best done downstream as opposed to during scanning. In some embodiments, this may resolve the challenge of running sophisticated models on a scanning device live during a scan, and the risk of false positives when classifying a region as debris or annotation and skipping a scan of a relevant region. Also, annotations may be useful for downstream tasks may need to be scanned for use in multimodal learning downstream. In some embodiments, segmentation followed by best focus determination may be a beneficial approach for detecting all regions of interest at the optimal focus obtained by best row estimation.

Figure 7:
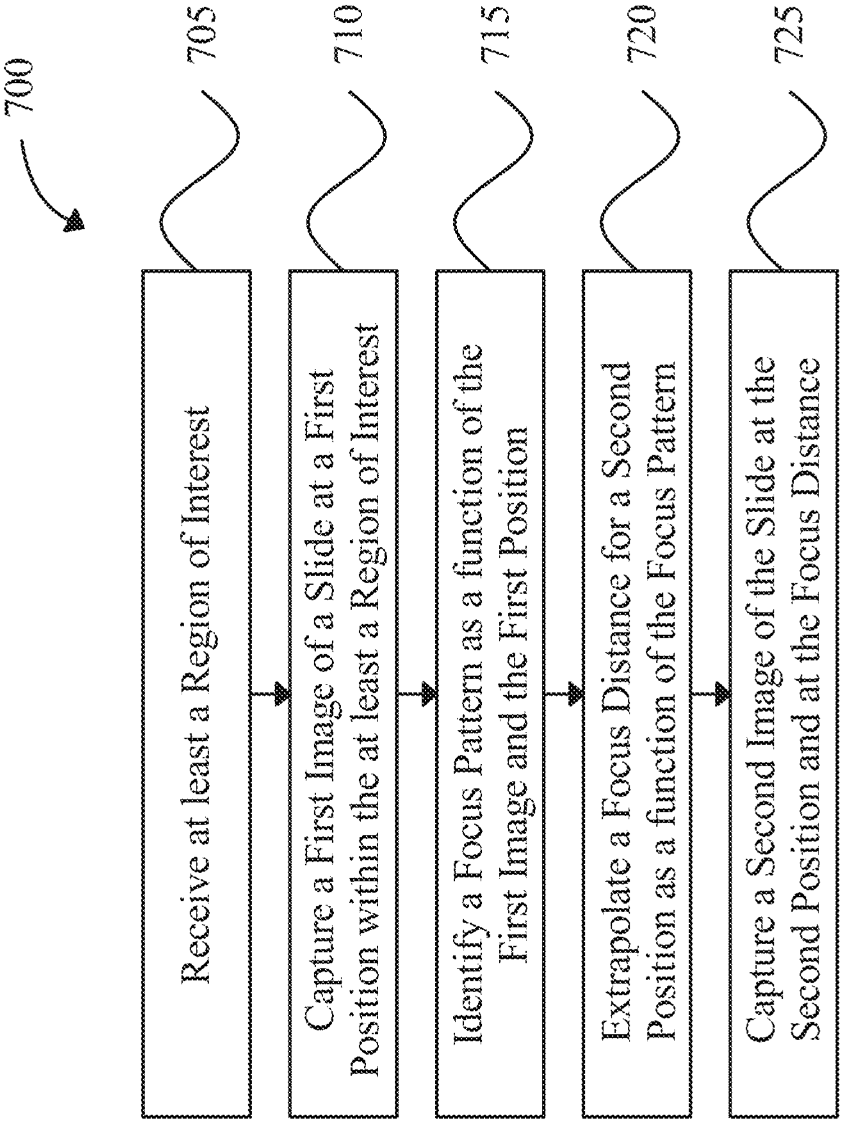
FIG. 7 is a diagram depicting an exemplary method of slide imaging.

Referring now to FIG. 7, an exemplary embodiment of a method 700 of slide imaging is illustrated. One or more steps of method 700 may be implemented, without limitation, as described herein in reference to other figures. One or more steps of method 700 may be implemented, without limitation, using at least a processor.

Still referring to FIG. 7, in some embodiments, method 700 may include receiving at least a region of interest 705.

Still referring to FIG. 7, in some embodiments, method 700 may include, using at least an optical system, capturing a first image of the slide at a first position within the at least a region of interest 710.

Still referring to FIG. 7, in some embodiments, method 700 may include identifying a focus pattern as a function of the first image and the first position 715. In some embodiments, identifying the focus pattern includes identifying a row which includes the first position; capturing a plurality of first images at the first location, wherein each of the plurality of first images has a different focus distance; determining an optimally focused first image of the plurality of first images having an optimal focus; and identifying the focus pattern using a focus distance of a plurality of optimally focused images at a set of points along the row. In some embodiments, the row further includes the second position and the method further includes using at least a processor and the optical system, capturing a plurality of second images at the second location, wherein each of the plurality of second images have a different focus distance; using at least a processor, determining an optimally focused second image of the plurality of second images having an optimal focus; using at least a processor, identifying the focus pattern using the focus distance of the optimally focused first image and the optimally focused second image; and using at least a processor, extrapolating a third focus distance for a third position as a function of the focus pattern. In some embodiments, the third position is located outside of the row. In some embodiments, the third position is located within a different region of interest than the first position. In some embodiments, identifying the row comprises identifying the row based on a first row sample presence score from a first set of row sample presence scores. In some embodiments, identifying the row based on the first row sample presence score includes determining the row whose adjacent rows have the highest sample presence scores from a second set of sample presence scores, wherein the second set of sample presence scores is determined using machine vision. In some embodiments, identifying the plane includes identifying a plurality of points and a plurality of optimal focuses at the plurality of points; and generating the plane as a function of a subset of the plurality of points and a corresponding subset of optimal focuses at those points. In some embodiments, identifying the focus pattern further includes updating the focus pattern, wherein updating the focus pattern includes identifying an additional point and an optimal focus at the additional point; and updating the focus pattern as a function of the additional point and optimal focus at the additional point.

Still referring to FIG. 7, in some embodiments, method 700 may include extrapolating a focus distance for a second position as a function of the focus pattern 720.

Still referring to FIG. 7, in some embodiments, method 700 may include, using at least an optical system, capturing a second image of the slide at a second position and at the focus distance 725. In some embodiments, capturing the second image includes capturing a plurality of images taken with focus distance based on the focus pattern; and constructing the second image from the plurality of images.

Still referring to FIG. 7, in some embodiments, method 700 may further include, using an actuator mechanism, moving a mobile element into the second position.

Still referring to FIG. 7, in some embodiments, method 700 may further include identifying a point within the row that has a maximum point sample presence score, using machine vision.

Still referring to FIG. 7, in some embodiments, method 700 may further include using at least a processor and the optical system, capturing a low magnification image of the slide, wherein the low magnification image has a magnification lower than that of the first image; using at least a processor and machine vision, identifying the at least a region of interest within the low magnification image; and using at least a processor, determining sample if either of the first image or the second image contains a sample.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 8:
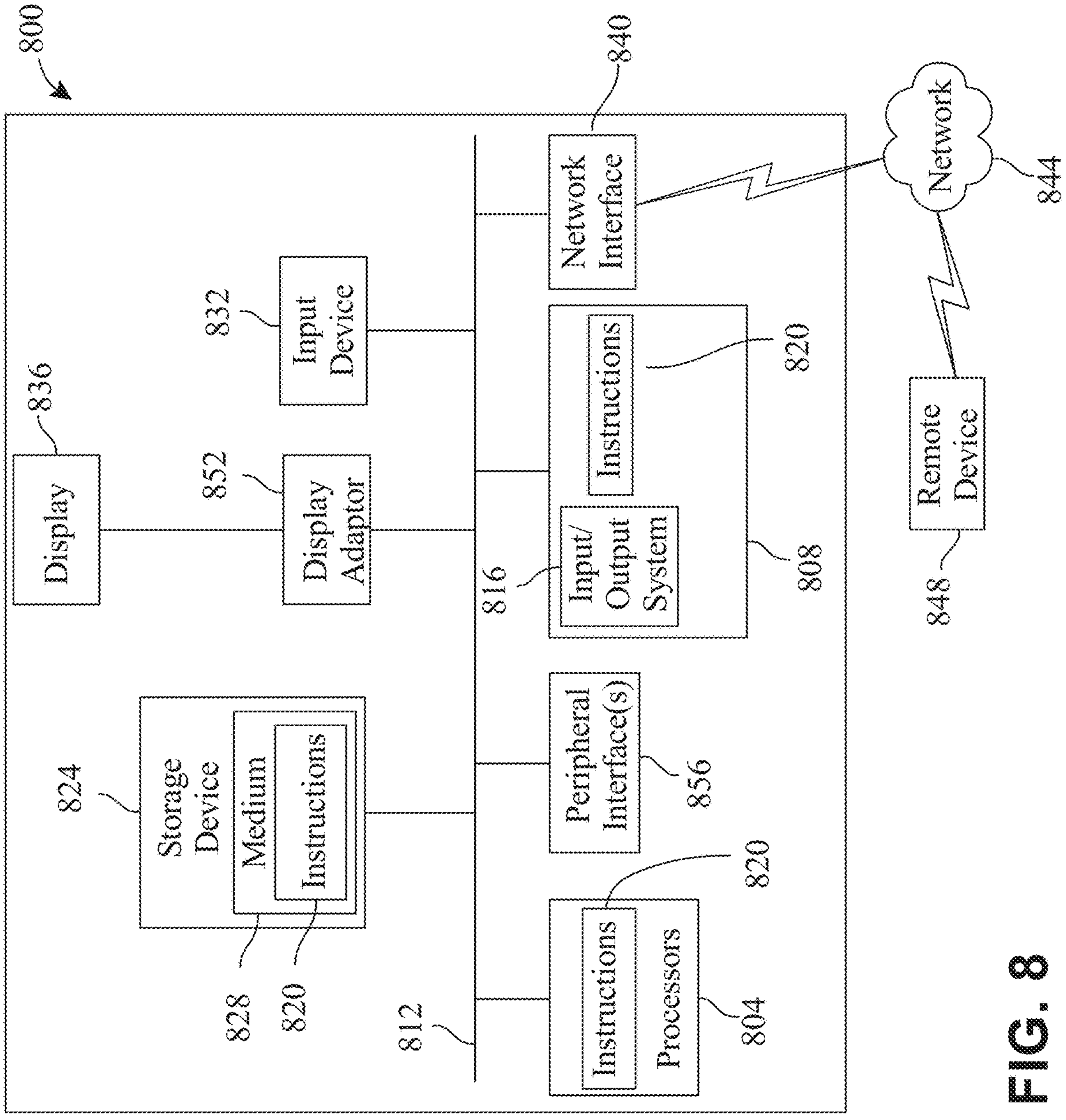
FIG. 8 is a block diagram of a computing system that can be used to implement any one or more of the methodologies disclosed herein and any one or more portions thereof.

FIG. 8 shows a diagrammatic representation of one embodiment of a computing device in the exemplary form of a computer system 800 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 800 includes a processor 804 and a memory 808 that communicate with each other, and with other components, via a bus 812. Bus 812 may include any of several types of bus structures including, but not limited to, a memory bus, a memory controller, a peripheral bus, a local bus, and any combinations thereof, using any of a variety of bus architectures.

Processor 804 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 804 may be organized according to Von Neumann and/or Harvard architecture as a non-limiting example. Processor 804 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC).

Memory 808 may include various components (e.g., machine-readable media) including, but not limited to, a random-access memory component, a read only component, and any combinations thereof. In one example, a basic input/output system 816 (BIOS), including basic routines that help to transfer information between elements within computer system 800, such as during start-up, may be stored in memory 808. Memory 808 may also include (e.g., stored on one or more machine-readable media) instructions (e.g., software) 820 embodying any one or more of the aspects and/or methodologies of the present disclosure. In another example, memory 808 may further include any number of program modules including, but not limited to, an operating system, one or more application programs, other program modules, program data, and any combinations thereof.

Computer system 800 may also include a storage device 824. Examples of a storage device (e.g., storage device 824) include, but are not limited to, a hard disk drive, a magnetic disk drive, an optical disc drive in combination with an optical medium, a solid-state memory device, and any combinations thereof. Storage device 824 may be connected to bus 812 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 824 (or one or more components thereof) may be removably interfaced with computer system 800 (e.g., via an external port connector (not shown)). Particularly, storage device 824 and an associated machine-readable medium 828 may provide nonvolatile and/or volatile storage of machine-readable instructions, data structures, program modules, and/or other data for computer system 800. In one example, software 820 may reside, completely or partially, within machine-readable medium 828. In another example, software 820 may reside, completely or partially, within processor 804.

Computer system 800 may also include an input device 832. In one example, a user of computer system 800 may enter commands and/or other information into computer system 800 via input device 832. Examples of an input device 832 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 832 may be interfaced to bus 812 via any of a variety of interfaces (not shown) including, but not limited to, a serial interface, a parallel interface, a game port, a USB interface, a FIREWIRE interface, a direct interface to bus 812, and any combinations thereof. Input device 832 may include a touch screen interface that may be a part of or separate from display 836, discussed further below. Input device 832 may be utilized as a user selection device for selecting one or more graphical representations in a graphical interface as described above.

A user may also input commands and/or other information to computer system 800 via storage device 824 (e.g., a removable disk drive, a flash drive, etc.) and/or network interface device 840. A network interface device, such as network interface device 840, may be utilized for connecting computer system 800 to one or more of a variety of networks, such as network 844, and one or more remote devices 848 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 844, may employ a wired and/or a wireless mode of communication. In general, any network topology may be used. Information (e.g., data, software 820, etc.) may be communicated to and/or from computer system 800 via network interface device 840.

Computer system 800 may further include a video display adapter 852 for communicating a displayable image to a display device, such as display device 836. Examples of a display device include, but are not limited to, a liquid crystal display (LCD), a cathode ray tube (CRT), a plasma display, a light emitting diode (LED) display, and any combinations thereof. Display adapter 852 and display device 836 may be utilized in combination with processor 804 to provide graphical representations of aspects of the present disclosure. In addition to a display device, computer system 800 may include one or more other peripheral output devices including, but not limited to, an audio speaker, a printer, and any combinations thereof. Such peripheral output devices may be connected to bus 812 via a peripheral interface 856. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. An apparatus for imaging a slide, the apparatus comprising:

at least an optical system, including an optical sensor;

at least a processor; and a memory communicatively connected to the at least a processor, the memory containing instructions configuring the at least a processor to:

capture, using the at least an optical system, a plurality of first images of the slide at a first position, wherein each of the plurality of first images comprises a different focus distance;

identify a focus pattern, wherein identifying the focus pattern comprises using respective focus distances of a plurality of optimally focused images at a set of points along a row;

extrapolate a focus distance for a second position as a function of the focus pattern; and capture, using the at least an optical system, a second image of the slide at the second position and at the focus distance.

2. The apparatus of claim 1, further comprising an actuator mechanism mechanically connected to the at least an optical system wherein the actuator mechanism is configured to move the at least an optical system into the second position.

3. The apparatus of claim 2, wherein the actuator mechanism is electronic communication with actuator controls, wherein the actuator controls operate the actuator mechanism based on input received from a user interface comprising at least an input interface.

4. The apparatus of claim 1, wherein the at least a processor is further configured to determine a region of interest for a slide, wherein the first position is located within the region of interest.

5. The apparatus of claim 4, wherein determining the region of interest comprises using a sample identification machine learning model trained on a dataset including example images of slides and segments of images of slides, associated with whether a sample is present to receive the second image as an input and output a determination.

6. The apparatus of claim 4, wherein determining the region of interest comprises using a ROI identification machine learning model trained on a dataset including example images of slides, associated with example regions of those images in which a feature is present to receive an image of a slide as an input and output data as to a location of any regions of interest present.

7. The apparatus of claim 4, further comprising an image processing module configured to determine a degree of quality of depiction of the region of interest in an image.

8. The apparatus of claim 7, wherein determining the degree of quality comprises performing a blur detection process.

9. The apparatus of claim 1, wherein identifying the focus pattern comprises identifying the row from the plurality of first images, wherein identifying the row comprises identifying the row based on a first row sample presence score from a first set of row sample presence scores.

10. The apparatus of claim 1, wherein identifying the focus pattern comprises identifying the row from the plurality of first images, wherein identifying the row comprises identifying a point within the row that has a maximum point sample presence score.

11. A method of imaging a slide, the method comprising:

capturing, by at least a computing device and an optical system, a plurality of first images of the slide at a first position, wherein each of the plurality of first images comprises a different focus distance, wherein the optical system comprises an optical sensor;

identifying, by the at least a computing device, a focus pattern, wherein identifying the focus pattern comprises using respective focus distances of a plurality of optimally focused images at a set of points along a row;

extrapolating, by the at least a computing device, a focus distance for a second position as a function of the focus pattern; and capturing, by the at least a computing device and the optical system, a second image of the slide at the second position and at the focus distance.

12. The method of claim 11, wherein capturing the second image comprises employing an actuator mechanism mechanically connected to the at least an optical system wherein the actuator mechanism is configured to move the at least an optical system into the second position.

13. The method of claim 12, wherein the actuator mechanism is electronic communication with actuator controls, wherein the actuator controls operate the actuator mechanism based on input received from a user interface comprising at least an input interface.

14. The method of claim 11, further comprising determining, by the at least a computing device, a region of interest for a slide, wherein the first position is located within the region of interest.

15. The method of claim 14, wherein determining the region of interest comprises using a sample identification machine learning model trained on a dataset including example images of slides and segments of images of slides, associated with whether a sample is present to receive the second image as an input and output a determination.

16. The method of claim 14, wherein determining the region of interest comprises using a ROI identification machine learning model trained on a dataset including example images of slides, associated with example regions of those images in which a feature is present to receive an image of a slide as an input and output data as to a location of any regions of interest present.

17. The method of claim 14, further comprising employing an image processing module configured to determine a degree of quality of depiction of the region of interest in an image.

18. The method of claim 17, wherein determining the degree of quality comprises performing a blur detection process.

19. The method of claim 11, wherein identifying the focus pattern comprises identifying the row from the plurality of first images, wherein identifying the row comprises identifying the row based on a first row sample presence score from a first set of row sample presence scores.

20. The method of claim 11, wherein identifying the focus pattern comprises identifying the row from the plurality of first images, wherein identifying the row comprises identifying a point within the row that has a maximum point sample presence score.

* * * * *